(12) United States Patent
Hsu et al.

(10) Patent No.: US 8,284,502 B2
(45) Date of Patent: Oct. 9, 2012

(54) OPTICAL LENS ASSEMBLY

(75) Inventors: Chih Wen Hsu, Taichung (TW); Hsin Hsuan Huang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 116 days.

(21) Appl. No.: 13/032,682

(22) Filed: Feb. 23, 2011

(65) Prior Publication Data
US 2012/0099009 A1  Apr. 26, 2012

(30) Foreign Application Priority Data
Oct. 26, 2010 (TW) ................................ 99136447 A

(51) Int. Cl.
*G02B 9/34* (2006.01)
*G02B 13/18* (2006.01)
(52) U.S. Cl. ........................................ 359/779; 359/715
(58) Field of Classification Search .................. 359/715, 359/779
See application file for complete search history.

(56) References Cited

U.S. PATENT DOCUMENTS

| 7,145,736 B2 | 12/2006 | Noda |
| 7,660,049 B2 | 2/2010 | Tang |
| 2008/0055742 A1* | 3/2008 | Sato .............................. 359/779 |

* cited by examiner

*Primary Examiner* — William Choi
(74) *Attorney, Agent, or Firm* — Morris Manning & Martin LLP; Tim Tingkang Xia, Esq.

(57) ABSTRACT

This invention provides an optical lens assembly comprising, in order from an object side to an image side: a first lens element with positive refractive power; a second lens element with positive refractive power; a third lens element with negative refractive power having a concave object-side surface and a convex image-side surface, at least one of the object-side and image-side surfaces thereof being aspheric; and a fourth lens element with positive refractive power having an aspheric object-side surface and an aspheric image-side surface; wherein the number of lens elements with refractive power is four.

23 Claims, 26 Drawing Sheets

| TABLE 1 | | | | | | |
|---|---|---|---|---|---|---|
| (Embodiment 1) | | | | | | |
| f = 6.04 mm, Fno = 2.55, HFOV = 34.9 deg. | | | | | | |
| Surface # | | Curvature Radius | Thickness | Material | Index | Focal length |
| 0 | Object | Plano | Infinity | | | |
| 1 | Lens 1 | 4.15190 (ASP) | 0.800 | Plastic | APEL-5514ML | 1.54 | 20.09 |
| 2 | | 6.24050 (ASP) | 0.291 | | | |
| 3 | Ape. Stop | Plano | 0.424 | | | |
| 4 | Lens 2 | -3.91500 (ASP) | 3.000 | Plastic | ARTON-D4532 | 1.51 | 9.11 |
| 5 | | -2.68503 (ASP) | 2.085 | | | |
| 6 | Lens 3 | -1.18003 (ASP) | 1.148 | Plastic | PC | 1.58 | -20.88 |
| 7 | | -1.77495 (ASP) | 0.100 | | | |
| 8 | Lens 4 | 4.16180 (ASP) | 3.000 | Plastic | ARTON-D4532 | 1.51 | 9.16 |
| 9 | | 27.24370 (ASP) | 1.000 | | | |
| 10 | IR-filter | Plano | 0.300 | Glass | BSC7 | 1.52 | - |
| 11 | | Plano | 0.500 | | | |
| 12 | Cover-glass | Plano | 0.550 | Glass | BSC7 | 1.52 | - |
| 13 | | Plano | 1.444 | | | |
| 14 | Image | Plano | - | | | |
| Note: The criterion wavelength for calculation of focal length(f) and index of refraction(Index) is 587.6 nm. | | | | | | |

Fig.7

| TABLE 2 | | | | |
|---|---|---|---|---|
| Aspheric Coefficients | | | | |
| Surface # | 1 | 2 | 4 | 5 |
| k    = | 3.66395E+00 | 1.04872E+01 | 7.02653E+00 | -9.15722E-01 |
| A4 = | 8.20849E-03 | 1.06410E-02 | -2.75114E-03 | -4.72166E-03 |
| A6 = | 1.06534E-03 | -4.30166E-04 | 3.79481E-03 | 1.04902E-03 |
| A8 = | -3.92055E-05 | 1.38140E-03 | -2.78891E-03 | -7.52619E-04 |
| A10 = | 1.15916E-04 | -1.19135E-03 | 8.57197E-04 | 2.17486E-04 |
| A12 = | | | 2.43979E-05 | -3.07144E-05 |
| A14 = | | | | 1.59689E-06 |
| Surface # | 6 | 7 | 8 | 9 |
| k    = | -1.65544E+00 | -7.79377E-01 | -1.66024E+00 | -1.54025E+01 |
| A4 = | -1.77608E-02 | 7.61297E-03 | -7.20063E-03 | -5.84183E-03 |
| A6 = | 3.24809E-03 | -7.43325E-05 | 7.48959E-04 | 5.55729E-04 |
| A8 = | -1.08690E-04 | 8.48447E-05 | -5.04509E-05 | -3.33080E-05 |
| A10= | | -4.93694E-07 | 1.81186E-06 | 9.31001E-07 |
| A12 = | | -4.99949E-07 | -3.37435E-08 | -1.19085E-08 |
| A14 = | | 3.65662E-08 | | |

Fig.8

| TABLE 3 | | | | | | |
|---|---|---|---|---|---|---|
| (Embodiment 2) | | | | | | |
| f = 5.88 mm, Fno = 2.80, HFOV = 31.0 deg. | | | | | | |
| Surface # | | Curvature Radius | Thickness | Material | Index | Focal length |
| 0 | Object | Plano | Infinity | | | |
| 1 | Lens 1 | 4.76220 (ASP) | 0.472 | Plastic | OKP4HT | 1.63 | 22.84 |
| 2 | | 6.83380 (ASP) | 0.098 | | | |
| 3 | Ape. Stop | Plano | 0.547 | | | |
| 4 | Lens 2 | 7.56560 (ASP) | 1.798 | Plastic | APEL-5514ML | 1.54 | 3.93 |
| 5 | | -2.72754 (ASP) | 0.542 | | | |
| 6 | Lens 3 | -0.91852 (ASP) | 1.040 | Plastic | OKP4HT | 1.63 | -3.10 |
| 7 | | -2.48994 (ASP) | 0.482 | | | |
| 8 | Lens 4 | 2.75532 (ASP) | 2.750 | Plastic | APEL-5514ML | 1.54 | 4.93 |
| 9 | | -63.68070 (ASP) | 0.500 | | | |
| 10 | IR-filter | Plano | 0.300 | Glass | BSC7 | 1.52 | - |
| 11 | | Plano | 0.300 | | | |
| 12 | Cover-glass | Plano | 0.550 | Glass | BSC7 | 1.52 | - |
| 13 | | Plano | 1.368 | | | |
| 14 | Image | Plano | - | | | |
| Note: The criterion wavelength for calculation of focal length(f) and index of refraction(Index) is 587.6 nm | | | | | | |

Fig.9

| TABLE 4 | | | | |
|---|---|---|---|---|
| Aspheric Coefficients | | | | |
| Surface # | 1 | 2 | 4 | 5 |
| k = | -1.04879E+00 | 1.37807E+00 | -1.00000E+02 | -7.06504E-01 |
| A4 = | -5.38892E-03 | -1.30165E-02 | 2.06174E-02 | -5.43762E-03 |
| A6 = | 9.44510E-05 | -7.22339E-03 | -4.35665E-02 | -6.05699E-03 |
| A8 = | -4.33579E-03 | -6.35443E-03 | 2.29701E-02 | -2.16342E-03 |
| A10 = | -2.64484E-04 | 8.31662E-04 | -7.02423E-03 | 1.43757E-03 |
| A12 = | | | -2.47058E-03 | -3.77064E-04 |
| A14 = | | | | 2.80121E-05 |
| Surface # | 6 | 7 | 8 | 9 |
| k = | -1.98008E+00 | -8.39597E-01 | -8.11105E+00 | -1.00000E+02 |
| A4 = | -4.58832E-02 | 2.61987E-03 | -5.54255E-03 | -3.22032E-03 |
| A6 = | 1.84914E-02 | 2.03673E-03 | -1.04830E-03 | -5.44148E-04 |
| A8 = | -1.16623E-03 | 1.96062E-04 | 1.72474E-05 | 1.59933E-06 |
| A10= | | -2.40029E-05 | 1.08483E-05 | 2.75390E-06 |
| A12 = | | 4.39695E-06 | -3.55435E-06 | -2.02737E-07 |
| A14 = | | -6.23959E-07 | | |

Fig.10

| TABLE 5 | | | | | | |
|---|---|---|---|---|---|---|
| (Embodiment 3) | | | | | | |
| f = 5.99 mm, Fno = 2.80, HFOV = 31.0 deg. | | | | | | |
| Surface # | | Curvature Radius | Thickness | Material | Index | Focal length |
| 0 | Object | Plano | Infinity | | | |
| 1 | Ape. Stop | Plano | 0.100 | | | |
| 2 | Lens 1 | -8.33330 (ASP) | 0.537 | Plastic | OKP4 | 1.61 | 7.64 |
| 3 | | -3.05350 (ASP) | 0.276 | | | |
| 4 | Lens 2 | -14.41770 (ASP) | 2.000 | Plastic | APEL-5514ML | 1.54 | 3.55 |
| 5 | | -1.78591 (ASP) | 0.465 | | | |
| 6 | Lens 3 | -1.15685 (ASP) | 2.334 | Plastic | OKP4HT | 1.63 | -6.63 |
| 7 | | -2.84614 (ASP) | 0.282 | | | |
| 8 | Lens 4 | 5.87290 (ASP) | 2.000 | Plastic | ZEONEX E48R | 1.53 | 46.43 |
| 9 | | 6.80430 (ASP) | 0.500 | | | |
| 10 | IR-filter | Plano | 0.300 | Glass | BSC7 | 1.52 | - |
| 11 | | Plano | 0.300 | | | |
| 12 | Cover-glass | Plano | 0.550 | Glass | BSC7 | 1.52 | - |
| 13 | | Plano | 1.206 | | | |
| 14 | Image | Plano | - | | | |
| Note: The criterion wavelength for calculation of focal length(f) and index of refraction(Index) is 587.6 nm | | | | | | |

Fig.11

| TABLE 6 | | | | |
|---|---|---|---|---|
| Aspheric Coefficients | | | | |
| Surface # | 2 | 3 | 4 | 5 |
| k = | -4.37168E+01 | -1.76960E+01 | -1.00000E+02 | -2.65673E-01 |
| A4 = | 4.79617E-03 | -3.12650E-03 | 4.57932E-02 | 8.81972E-03 |
| A6 = | 7.71004E-03 | 7.67103E-03 | -5.11846E-02 | -3.40223E-03 |
| A8 = | -9.03701E-03 | -9.20862E-03 | 8.31436E-03 | -1.19438E-03 |
| A10 = | 2.24822E-03 | 1.69469E-03 | 2.09640E-03 | 1.72168E-03 |
| A12 = | | | -2.44956E-03 | -5.09530E-04 |
| A14 = | | | | 4.80083E-05 |
| Surface # | 6 | 7 | 8 | 9 |
| k = | -2.34634E+00 | -7.96894E+00 | -2.34109E+00 | -1.00000E+02 |
| A4 = | -4.12464E-02 | -7.28632E-06 | 7.01833E-03 | 3.34948E-03 |
| A6 = | 1.80680E-02 | 7.59272E-04 | -3.50767E-03 | -1.91143E-03 |
| A8 = | -1.56204E-03 | 1.78106E-04 | 1.90914E-04 | 7.23726E-05 |
| A10= | | -1.73958E-05 | 2.76330E-05 | 5.94794E-06 |
| A12 = | | 2.77319E-06 | -3.97489E-06 | -5.32457E-07 |
| A14 = | | -3.99133E-07 | | |

Fig.12

| TABLE 7 | | | | | | |
|---|---|---|---|---|---|---|
| (Embodiment 4) | | | | | | |
| f = 6.00 mm, Fno = 2.45, HFOV= 35.7 deg. | | | | | | |
| Surface # | | Curvature Radius | Thickness | Material | Index | Focal length |
| 0 | Object | Plano | Infinity | | | |
| 1 | Lens 1 | 2.62939 (ASP) | 0.937 | Plastic | PC | 1.57 | 32.91 |
| 2 | | 2.66296 (ASP) | 0.412 | | | |
| 3 | Ape. Stop | Plano | 0.257 | | | |
| 4 | Lens 2 | -6.76880 (ASP) | 2.966 | Plastic | OKP4HT | 1.61 | 7.72 |
| 5 | | -3.25340 (ASP) | 1.946 | | | |
| 6 | Lens 3 | -1.17551 (ASP) | 1.427 | Plastic | ZEONEX F52R | 1.53 | -8.93 |
| 7 | | -2.22317 (ASP) | 0.100 | | | |
| 8 | Lens 4 | 3.19700 (ASP) | 3.000 | Plastic | ZEONEX F52R | 1.53 | 5.93 |
| 9 | | -100.00000 (ASP) | 1.000 | | | |
| 10 | IR-filter | Plano | 0.700 | Glass | BSC7 | 1.51 | - |
| 11 | | Plano | 1.658 | | | |
| 12 | Image | Plano | - | | | |
| Note: The criterion wavelength for calculation of focal length(f) and index of refraction(Index) is 830 nm | | | | | | |

Fig.13

| TABLE 8 | | | | |
|---|---|---|---|---|
| Aspheric Coefficients | | | | |
| Surface # | 1 | 2 | 4 | 5 |
| k = | 1.17542E+00 | -7.24752E-02 | 4.57062E+00 | -1.08763E+00 |
| A4 = | -3.59014E-04 | 1.59341E-02 | -8.00640E-03 | -5.98659E-04 |
| A6 = | 7.01279E-04 | 4.56455E-03 | 4.26829E-03 | 5.34129E-04 |
| A8 = | -6.73049E-04 | -1.07858E-03 | -5.47491E-03 | -1.69988E-04 |
| A10 = | 1.81168E-04 | 3.41276E-03 | 2.42830E-03 | 4.62479E-05 |
| A12 = | -1.26813E-05 | | 2.43944E-05 | -6.85154E-06 |
| A14 = | | | | 3.54550E-07 |
| Surface # | 6 | 7 | 8 | 9 |
| k = | -1.92472E+00 | -7.93396E-01 | -3.98392E+00 | -6.04961E+01 |
| A4 = | -1.14539E-03 | 6.50683E-03 | -3.86947E-03 | -3.98582E-03 |
| A6 = | 5.55130E-04 | -3.97457E-04 | 4.54684E-04 | 4.17986E-04 |
| A8 = | -8.95657E-07 | 2.59522E-05 | -3.24803E-05 | -2.44002E-05 |
| A10= | -1.94550E-07 | 6.06740E-07 | 1.21887E-06 | 6.91825E-07 |
| A12 = | | -2.77129E-07 | -2.18606E-08 | -9.71380E-09 |
| A14 = | | 1.82597E-08 | | |

Fig.14

| TABLE 9 | | | | | | |
|---|---|---|---|---|---|---|
| (Embodiment 5) | | | | | | |
| f = 6.12 mm, Fno = 2.60, HFOV= 34.3 deg. | | | | | | |
| Surface # | | Curvature Radius | Thickness | Material | Index | Focal length |
| 0 | Object | Plano | Infinity | | | |
| 1 | Lens 1 | 2.84747 (ASP) | 0.815 | Plastic | PC | 1.57 | 609.97 |
| 2 | | 2.57274 (ASP) | 0.685 | | | |
| 3 | Ape. Stop | Plano | 0.887 | | | |
| 4 | Lens 2 | 20.00000 (ASP) | 2.650 | Plastic | OKP4HT | 1.61 | 10.56 |
| 5 | | -9.11839 (ASP) | 1.476 | | | |
| 6 | Lens 3 | -1.84969 (ASP) | 1.828 | Plastic | ZEONEX F52R | 1.53 | -152.47 |
| 7 | | -2.53912 (ASP) | 0.100 | | | |
| 8 | Lens 4 | 2.86753 (ASP) | 3.000 | Plastic | ZEONEX F52R | 1.53 | 9.57 |
| 9 | | 4.24413 (ASP) | 1.200 | | | |
| 10 | IR-filter | Plano | 0.700 | Glass | BSC7 | 1.51 | - |
| 11 | | Plano | 0.937 | | | |
| 12 | Image | Plano | - | | | |
| Note: The criterion wavelength for calculation of focal length(f) and index of refraction(Index) is 830 nm | | | | | | |

Fig.15

| TABLE 10 | | | | |
|---|---|---|---|---|
| Aspheric Coefficients | | | | |
| Surface # | 1 | 2 | 4 | 5 |
| k = | 8.74320E-01 | 4.65922E-01 | 7.44680E+01 | -7.07530E+00 |
| A4 = | 3.17092E-03 | 1.31984E-02 | -1.06995E-03 | -1.06607E-04 |
| A6 = | 5.17175E-04 | 1.78011E-04 | 1.99313E-05 | 1.11337E-04 |
| A8 = | -3.24169E-04 | 2.43895E-03 | -9.77606E-06 | -2.03620E-04 |
| A10 = | 1.69228E-04 | -9.61229E-05 | 3.28759E-05 | 4.67884E-05 |
| A12 = | -2.29080E-05 | | -5.30963E-06 | -5.42755E-06 |
| A14 = | | | | 2.63895E-07 |
| Surface # | 6 | 7 | 8 | 9 |
| k = | -3.01957E+00 | -7.31760E-01 | -1.63967E+00 | -3.56610E+00 |
| A4 = | -6.72171E-03 | 1.22485E-04 | -5.61405E-03 | -5.29480E-03 |
| A6 = | -1.17706E-04 | -2.77714E-04 | 5.61799E-04 | 4.76326E-04 |
| A8 = | -3.85796E-05 | 3.36326E-05 | -3.17069E-05 | -2.41799E-05 |
| A10= | -3.01251E-06 | -1.34225E-06 | 9.90840E-07 | 5.29192E-07 |
| A12 = | | -3.98248E-07 | -1.45802E-08 | -4.53464E-09 |
| A14 = | | 2.77328E-08 | | |

Fig.16

| TABLE 11 | | | | | | | |
|---|---|---|---|---|---|---|---|
| (Embodiment 6) | | | | | | | |
| f = 6.06 mm, Fno = 2.45, HFOV= 35.2 deg. | | | | | | | |
| Surface # | | Curvature Radius | Thickness | Material | | Index | Focal length |
| 0 | Object | Plano | Infinity | | | | |
| 1 | Lens 1 | 2.52044 (ASP) | 0.716 | Plastic | PC | 1.57 | 18.42 |
| 2 | | 2.97539 (ASP) | 0.321 | | | | |
| 3 | Ape. Stop | Plano | 0.361 | | | | |
| 4 | Lens 2 | -3.70960 (ASP) | 2.486 | Plastic | PC | 1.57 | 9.07 |
| 5 | | -2.68352 (ASP) | 2.194 | | | | |
| 6 | Lens 3 | -1.15477 (ASP) | 1.198 | Plastic | PC | 1.57 | -8.18 |
| 7 | | -2.11370 (ASP) | 0.338 | | | | |
| 8 | Lens 4 | 3.00330 (ASP) | 3.000 | Plastic | ARTON-D4532 | 1.51 | 5.81 |
| 9 | | -100.00000 (ASP) | 1.000 | | | | |
| 10 | IR-filter | Plano | 0.700 | Glass | BSC7 | 1.51 | - |
| 11 | | Plano | 1.712 | | | | |
| 12 | Image | Plano | - | | | | |
| Note: The criterion wavelength for calculation of focal length(f) and index of refraction(Index) is 830 nm | | | | | | | |

Fig.17

| TABLE 12 | | | | |
|---|---|---|---|---|
| Aspheric Coefficients | | | | |
| Surface # | 1 | 2 | 4 | 5 |
| k = | 1.65537E+00 | 6.62481E-02 | 3.02062E+00 | -1.63965E+00 |
| A4 = | 1.29463E-03 | 1.66708E-02 | -9.45174E-03 | -4.67827E-03 |
| A6 = | 5.35285E-04 | 6.02867E-03 | -8.88497E-03 | -2.62977E-04 |
| A8 = | -4.19114E-04 | -6.61570E-04 | 8.43638E-03 | 7.28283E-05 |
| A10 = | 1.49397E-04 | 1.92423E-03 | -6.71452E-03 | 9.19743E-06 |
| A12 = | -7.73764E-06 | | 2.43950E-05 | -4.25712E-06 |
| A14 = | | | | 9.88581E-08 |
| Surface # | 6 | 7 | 8 | 9 |
| k = | -2.00932E+00 | -6.85777E-01 | -4.83455E+00 | -9.90000E+01 |
| A4 = | -8.54585E-03 | 6.99135E-03 | -3.87317E-03 | -5.50697E-03 |
| A6 = | 1.74089E-03 | -1.05162E-04 | 5.07373E-04 | 5.82329E-04 |
| A8 = | -4.04852E-05 | 4.05030E-05 | -3.09602E-05 | -2.80593E-05 |
| A10= | -7.41041E-07 | -5.24872E-07 | 1.00184E-06 | 6.54753E-07 |
| A12 = | | -1.94306E-07 | -1.53612E-08 | -7.64566E-09 |
| A14 = | | 2.44175E-08 | | |

Fig.18

| TABLE 13 | | | | | | |
|---|---|---|---|---|---|---|
| | Embodiment 1 | Embodiment 2 | Embodiment 3 | Embodiment 4 | Embodiment 5 | Embodiment 6 |
| f | 6.04 | 5.88 | 5.99 | 6.00 | 6.12 | 6.06 |
| Fno | 2.55 | 2.80 | 2.80 | 2.45 | 2.60 | 2.45 |
| HFOV | 34.9 | 31.0 | 31.0 | 35.7 | 34.3 | 35.2 |
| CT1/CT2 | 0.27 | 0.26 | 0.27 | 0.32 | 0.31 | 0.29 |
| CT4/f | 0.50 | 0.47 | 0.33 | 0.50 | 0.49 | 0.50 |
| |R4/R3| | 0.69 | 0.36 | 0.12 | 0.48 | 0.46 | 0.72 |
| |R7/R8| | 0.15 | 0.04 | 0.86 | 0.03 | 0.68 | 0.03 |
| (R5+R6)/(R5-R6) | -4.97 | -2.17 | -2.37 | -3.24 | -6.37 | -3.41 |
| f/f1 | 0.30 | 0.26 | 0.78 | 0.18 | 0.01 | 0.33 |
| f2/f4 | 0.99 | 0.80 | 0.08 | 1.30 | 1.10 | 1.56 |
| SAG42/CT4 | -0.22 | -0.36 | -0.36 | -0.24 | 0.28 | -0.19 |
| Sd/Td | 0.90 | 0.93 | 1.01 | 0.88 | 0.87 | 0.90 |
| TTL/ImgH | 3.42 | 2.94 | 2.94 | 3.41 | 3.38 | 3.32 |

Fig.19

OPTICAL LENS ASSEMBLY

CROSS-REFERENCE TO RELATED APPLICATIONS

This non-provisional application claims priority under 35 U.S.C. §119(a) on Patent Application No(s). 099136447 filed in Taiwan, R.O.C. on Oct. 26, 2010, the entire contents of which are hereby incorporated by reference.

BACKGROUND OF THE INVENTION

1. Field of the Invention

The present invention relates to an optical lens assembly, and more particularly, to a compact optical lens assembly applicable to electronic products.

2. Description of the Prior Art

The demand for compact imaging lens assemblies has grown in recent years as the popularity of portable electronic products with the photographing function has increased, and the sensor of a general photographing camera is none other than CCD (Charge Coupled Device) or CMOS (Complementary Metal-Oxide Semiconductor Sensor). Furthermore, as advances in manufacturing technology of semiconductor have allowed the pixel size of sensors to be reduced, and the resolution of compact imaging lens assemblies has gradually increased, there is an increasing demand for compact imaging lens assemblies featuring better image quality. A conventional compact imaging lens assembly for portable electronic products, such as the one disclosed in U.S. Pat. No. 7,145,736, is of a triplet type comprising, in order from the object side to the image side: a first lens element with positive refractive power; a second lens element with negative refractive power; and a third lens element with positive refractive power. However, as modern electronic products are becoming even more compact and powerful in functionalities, the demand for imaging quality will definitely increase. Therefore, the three-element lens assembly has become insufficient for a high-end imaging lens module, such as camera units on current high-end smartphones.

U.S. Pat. No. 7,660,049 has disclosed a lens assembly comprising four lens elements, wherein the first lens element has negative refractive power and is meniscus in shape so that the aberration and astigmatism of the optical system can be effectively eliminated to improve the image quality. Such arrangement of optical elements, however, will results in a longer total track length as well as the sensitivity of the positive second lens element remains excessively high.

In the light of foregoing, a need exists in the art for an optical lens assembly that features better image quality, maintains a moderate total track length and is applicable to compact portable electronic products.

SUMMARY OF THE INVENTION

The present invention provides an optical lens assembly comprising, in order from an object side to an image side: a first lens element with positive refractive power; a second lens element with positive refractive power; a third lens element with negative refractive power having a concave object-side surface and a convex image-side surface, at least one of the object-side and image-side surfaces thereof being aspheric; and a fourth lens element with positive refractive power having an aspheric object-side surface and an aspheric image-side surface; wherein the number of lens elements with refractive power is four; and wherein a thickness of the first lens element on an optical axis is CT1, a thickness of the second lens element on the optical axis is CT2, a radius of curvature of the object-side surface of the fourth lens element is R7, a radius of curvature of the image-side surface of the fourth lens element is R8, a thickness of the fourth lens element on the optical axis is CT4, a focal length of the optical lens assembly is f, and they satisfy the relations: $0.0 < CT1/CT2 < 0.6$; $|R7/R8| < 1.0$; and $0.25 < CT4/f < 0.85$.

The present invention provides another optical lens assembly comprising, in order from an object side to an image side: a first lens element with positive refractive power; a second lens element with positive refractive power having a convex image-side surface; a third lens element with negative refractive power having a concave object-side surface and a convex image-side surface, at least one of the object-side and image-side surfaces thereof being aspheric; and a fourth lens element with positive refractive power having an aspheric convex object-side surface and an aspheric image-side surface; wherein the optical lens assembly further comprises an aperture stop; and wherein a thickness of the first lens element on an optical axis is CT1, a thickness of the second lens element on the optical axis is CT2, a thickness of the fourth lens element on the optical axis is CT4, a focal length of the optical lens assembly is f, a distance on the optical axis between the aperture stop and the image-side surface of the fourth lens element is Sd, a distance on the optical axis between an object-side surface of the first lens element and the image-side surface of the fourth lens element is Td, and they satisfy the relations: $0.0 < CT1/CT2 < 0.6$; $0.25 < CT4/f < 0.85$; and $0.75 < Sd/Td < 0.94$.

With the aforementioned arrangement of lens elements, the size of the optical lens assembly can be effectively reduced, the sensitivity of the optical system can be attenuated, and the resolution can be increased. Additionally, the lens elements employed in a conventional imaging lens assembly and those used in an infrared optical system are made of different materials. Take an infrared optical system for example, the lens elements used therein are generally made of germanium (Ge) or other materials (such as ZnSe, ZnS, etc.). The present optical lens assembly is not only characterized by better image quality, but is capable of being integrated into the infrared optical system for image formation. Therefore, the present invention has a wider range of applications than a general imaging lens assembly.

In the present optical lens assembly, the first lens element with positive refractive power provides part of the refractive power for the optical system so that the total track length of the optical lens assembly can be favorably reduced; the second lens element has positive refractive power so that the refractive power of the first lens element can be favorably distributed and thereby to attenuate the sensitivity of the optical system; the third lens element has negative refractive power so that the aberration caused by the positive refractive power of the optical system and the chromatic aberration can be favorably corrected; the fourth lens element has positive refractive power so that the high order aberrations of the optical system can be favorably corrected, thereby increasing the resolution of the optical lens assembly.

Moreover, each of the third lens element and the fourth lens element may be provided with at least one inflection point, thereby the angle at which the light is projected onto the sensor from the off-axis field can be effectively reduced to further correct the off-axis aberrations.

BRIEF DESCRIPTION OF THE DRAWINGS

FIG. 7 is TABLE 1 which lists the optical data of the first embodiment.

FIG. 8 is TABLE 2 which lists the aspheric surface data of the first embodiment.

FIG. 9 is TABLE 3 which lists the optical data of the second embodiment.

FIG. 10 is TABLE 4 which lists the aspheric surface data of the second embodiment.

FIG. 11 is TABLE 5 which lists the optical data of the third embodiment.

FIG. 12 is TABLE 6 which lists the aspheric surface data of the third embodiment.

FIG. 13 is TABLE 7 which lists the optical data of the fourth embodiment.

FIG. 14 is TABLE 8 which lists the aspheric surface data of the fourth embodiment.

FIG. 15 is TABLE 9 which lists the optical data of the fifth embodiment.

FIG. 16 is TABLE 10 which lists the aspheric surface data of the fifth embodiment.

FIG. 17 is TABLE 11 which lists the optical data of the sixth embodiment.

FIG. 18 is TABLE 12 which lists the aspheric surface data of the sixth embodiment.

FIG. 19 is TABLE 13 which lists the data of the respective results of the equations in accordance with all six embodiments.

DETAILED DESCRIPTION OF THE PREFERRED EMBODIMENTS

Figure 1A:
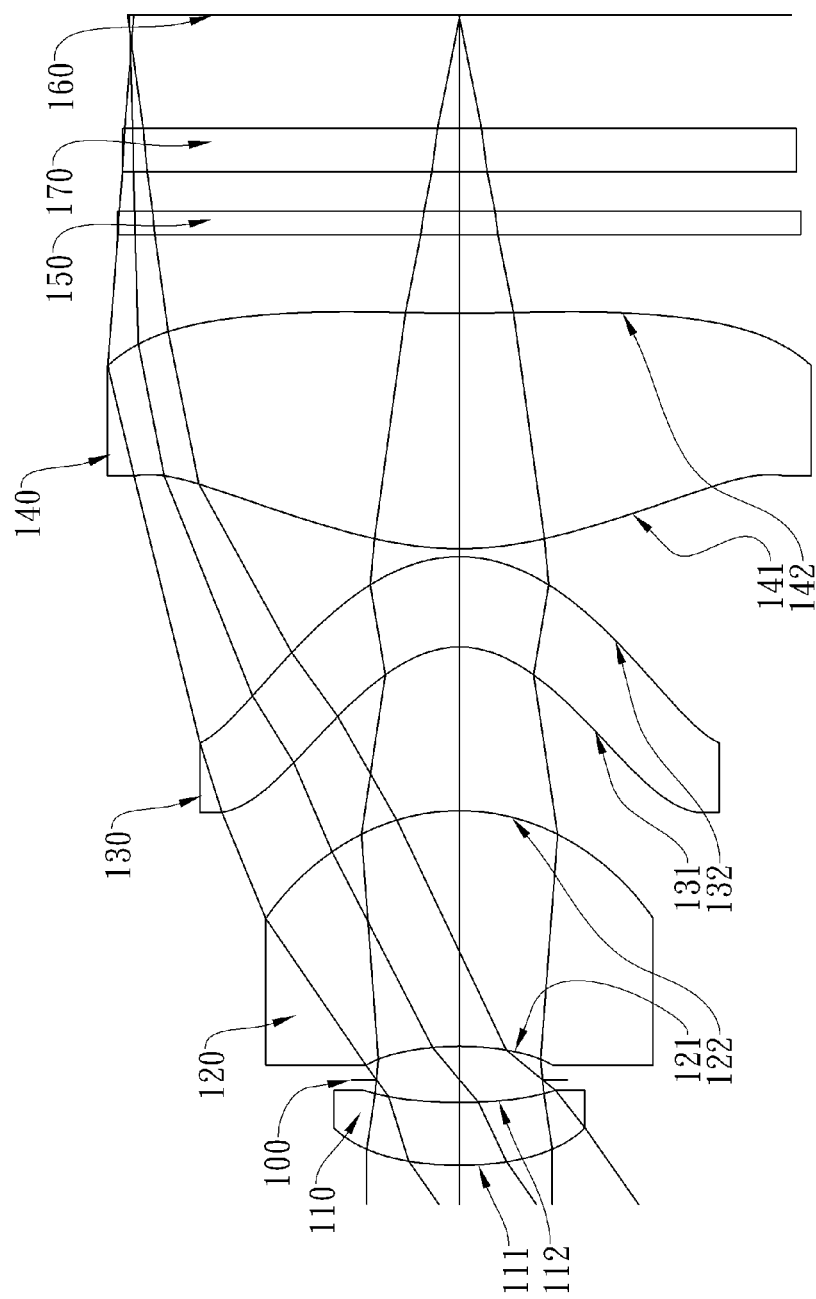
FIG. 1A shows an optical lens assembly in accordance with the first embodiment of the present invention.

The present invention provides an optical lens assembly comprising, in order from an object side to an image side: a first lens element with positive refractive power; a second lens element with positive refractive power; a third lens element with negative refractive power having a concave object-side surface and a convex image-side surface, at least one of the object-side and image-side surfaces thereof being aspheric; and a fourth lens element with positive refractive power having an aspheric object-side surface and an aspheric image-side surface; wherein the number of lens elements with refractive power is four; and wherein a thickness of the first lens element on an optical axis is CT1, a thickness of the second lens element on the optical axis is CT2, a radius of curvature of the object-side surface of the fourth lens element is R7, a radius of curvature of the image-side surface of the fourth lens element is R8, a thickness of the fourth lens element on the optical axis is CT4, a focal length of the optical lens assembly is f, and they satisfy the relations: $0.0<CT1/CT2<0.6$; $|R7/R8|<1.0$; and $0.25<CT4/f<0.85$.

When the relation of $0.0<CT1/CT2<0.6$ is satisfied, the thickness of the first lens element and the second lens element is more appropriate, thereby facilitating the assembly of the lens elements and the allocation of the space within the optical lens assembly. Preferably, CT1 and CT2 satisfy the relation: $0.0<CT1/CT2<0.35$. When the relation of $|R7/R8|<1.0$ is satisfied, the curvatures of the object-side surface and the image-side surface of the fourth lens element are more appropriate, thereby the positive refractive power of the first lens element can be favorably enhanced to effectively reduce the total track length. Preferably, R7 and R8 satisfy the relation: $|R7/R8|<0.70$. And it will be more preferable that R7 and R8 satisfy the relation: $|R7/R8|<0.35$. When the relation of $0.25<CT4/f<0.85$ is satisfied, the thickness of the fourth lens element is more appropriate, thereby providing a sufficient back focal length to accommodate other optical components. Preferably, CT4 and f satisfy the relation: $0.30<CT4/f<0.60$.

In the aforementioned optical lens assembly, it is preferable that the second lens element has a convex image-side surface. When the second lens element has a convex object-side surface and a convex image-side surface, the positive refractive power thereof can be favorably enhanced to facilitate the distribution of the refractive power of the first lens element, thereby the sensitivity of the optical system can be attenuated. When the second lens element has a concave object-side surface and a convex image-side surface, the astigmatism can be effectively corrected to improve the image quality of the optical system. Preferably, the fourth lens element has a convex object-side surface. When the fourth lens element has a convex object-side surface and a convex image-side surface, the total track length of the optical lens assembly can be favorably reduced, thereby the sensitivity of the optical system can be attenuated. When the fourth lens element has a convex object-side surface and a concave image-side surface, the astigmatism and high order aberrations of the optical system can be favorably corrected. Preferably, the third lens element and the fourth lens element are made of plastic material.

In the aforementioned optical lens assembly, it is preferable that at least one of the object-side and image-side surfaces of the fourth lens element is provided with at least one inflection point.

The aforementioned optical lens assembly further comprises an aperture stop. The distance on the optical axis between the aperture stop and the image-side surface of the fourth lens element is Sd, the distance on the optical axis between the object-side surface of the first lens element and the image-side surface of the fourth lens element is Td, and they preferably satisfy the relation: $0.75<Sd/Td<0.94$. When the above relation is satisfied, a wide field of view can be favorably achieved.

In the aforementioned optical lens assembly, the radius of curvature of the object-side surface of the fourth lens element is R7, the radius of curvature of the image-side surface of the fourth lens element is R8, and they preferably satisfy the relation: |R7/R8|<0.70.

In the aforementioned optical lens assembly, the radius of curvature of the object-side surface of the third lens element is R5, the radius of curvature of the image-side surface of the third lens element is R6, and they preferably satisfy the relation: −7<(R5+R6)/(R5−R6)<−2. When the above relation is satisfied, the aberration of the optical system can be favorably corrected.

In the aforementioned optical lens assembly, the focal length of the second lens element is f2, the focal length of the fourth lens element is f4, and they preferably satisfy the relation: 0.75<f2/f4<1.65. When the above relation is satisfied, the positive refractive power of the second lens element and the fourth lens element can be distributed more appropriately, thereby the sensitivity of the optical system can be favorably attenuated.

In the aforementioned optical lens assembly, the focal length of the optical lens assembly is f, the focal length of the first lens element is f1, and they preferably satisfy the relation: 0.0<f/f1<0.5. When the above relation is satisfied, the first lens element can provide part of the partial positive refractive power for the optical system, thereby the total track length of the optical lens assembly can be favorably reduced.

In the aforementioned optical lens assembly, the radius of curvature of the image-side surface of the second lens element is R4, the radius of curvature of the object-side surface of the second lens element is R3, and they preferably satisfy the relation: 0.1<|R4/R3|<0.7. When the above relation is satisfied, the total track length of the optical lens assembly can be favorably reduced and the astigmatism of the optical system can be effectively corrected.

In the aforementioned optical lens assembly, the radius of curvature of the object-side surface of the fourth lens element is R7, the radius of curvature of the image-side surface of the fourth lens element is R8, and they preferably satisfy the relation: |R7/R8|<0.35.

In the aforementioned optical lens assembly, the thickness of the first lens element on the optical axis is CT1, the thickness of the second lens element on the optical axis is CT2, and they preferably satisfy the relation: 0.0<CT1/CT2<0.35.

In the aforementioned optical lens assembly, it is preferable that at least one of the object-side and image-side surfaces of the third lens element is provided with at least one inflection point.

In the aforementioned optical lens assembly, it is preferable that the first lens element has a convex object-side surface and a concave image-side surface. Such arrangement facilitates the adjustment of the astigmatism of the optical system. The thickness of the fourth lens element on the optical axis is CT4, the focal length of the optical lens assembly is f, and they preferably satisfy the relation: 0.30<CT4/f<0.60. When the above relation is satisfied, the thickness of the fourth lens element is more appropriate, thereby providing a sufficient back focal length to accommodate other optical components.

In the aforementioned optical lens assembly, the radius of curvature of the object-side surface of the third lens element is R5, the radius of curvature of the image-side surface of the third lens element is R6, and they preferably satisfy the relation: −4.0<(R5+R6)/(R5−R6)<−2.0. When the above relation is satisfied, the aberration of the optical system can be favorably corrected.

In the aforementioned optical lens assembly, the vertical distance between the farthest point of the effective light entry area on the image-side surface of the fourth lens element and the optical axis is Y42, the distance on the optical axis between the image-side surface of the fourth lens element and the vertical projection from the farthest point on the image-side surface of the fourth lens element to the optical axis is SAG42, the thickness of the fourth lens element on the optical axis is CT4, and they preferably satisfy the relation: −0.45<SAG42/CT4<0.3. When the above relation is satisfied, the curvature of the fourth lens element can avoid being too large, thereby the lens elements can be favorably fabricated and formed. Having satisfied the above relation also facilitates the space reduction required to accommodate the lens elements so that the lens elements can be placed closer together.

The aforementioned optical lens assembly further comprises an image sensor disposed on the image plane. The distance on the optical axis between the object-side surface of the first lens element and the image plane is TTL, half of the diagonal length of the effective pixel area of the image sensor is ImgH, and they preferably satisfy the relation: TTL/ImgH<3.5. The satisfaction of the above relation enables the optical lens assembly to maintain a compact form so that it can be equipped in portable electronic products.

The present invention provides another optical lens assembly comprising, in order from an object side to an image side: a first lens element with positive refractive power; a second lens element with positive refractive power having a convex image-side surface; a third lens element with negative refractive power having a concave object-side surface and a convex image-side surface, at least one of the object-side and image-side surfaces thereof being aspheric; and a fourth lens element with positive refractive power having an aspheric convex object-side surface and an aspheric image-side surface; wherein the optical lens assembly further comprises an aperture stop; and wherein a thickness of the first lens element on an optical axis is CT1, a thickness of the second lens element on the optical axis is CT2, a thickness of the fourth lens element on the optical axis is CT4, a focal length of the optical lens assembly is f, a distance on the optical axis between the aperture stop and the image-side surface of the fourth lens element is Sd, a distance on the optical axis between an object-side surface of the first lens element and the image-side surface of the fourth lens element is Td, and they satisfy the relations: 0.0<CT1/CT2<0.6; 0.25<CT4/f<0.85; and 0.75<Sd/Td<0.94.

When the relation of 0.0<CT1/CT2<0.6 is satisfied, the thickness of the first lens element and the second lens element is more appropriate, thereby facilitating the assembly of the lens elements and the space allocation within the optical lens assembly. Preferably, CT1 and CT2 satisfy the relation: 0.0<CT1/CT2<0.35.

When the relation of 0.25<CT4/f<0.85 is satisfied, the thickness of the fourth lens element is more appropriate, thereby providing a sufficient back focal length to accommodate other optical components.

When the relation of 0.75<Sd/Td<0.94 is satisfied, a wide field of view can be favorably achieved.

When at least one of the object-side and image-side surfaces of each of the third lens element and the fourth lens element is provided with at least one inflection point, the angle at which light is projected onto the sensor from the off-axis field can be effectively reduced, thereby further correcting the off-axis aberrations.

In the aforementioned optical lens assembly, the first lens element has a convex object-side surface and a concave image-side surface. The focal length of the optical lens assembly is f, the focal length of the first lens element is f1, and they preferably satisfy the relation: 0.0<f/f1<0.5. When the above relation is satisfied, the first lens element can provide part of the positive refractive power for the optical system, thereby the total track length of the optical lens assembly can be favorably reduced.

In the aforementioned optical lens assembly, it is preferable that the third lens element and the fourth lens element are made of plastic material and at least one of the object-side and image-side surfaces of the fourth lens element is provided with at least one inflection point. With such arrangement, the angle at which light is projected onto the sensor from the off-axis field can be effectively reduced, thereby further correcting the off-axis aberrations.

In the aforementioned optical lens assembly, the radius of curvature of the object-side surface of the fourth lens element is R7, the radius of curvature of the image-side surface of the fourth lens element is R8, and they preferably satisfy the relation: |R7/R8|<0.70. When the above relation is satisfied, the curvature of the object-side and image-side surfaces of the fourth lens element is more appropriate, thereby the positive refractive power of the first lens element can be favorably enhanced to effectively reduce the total track length.

In the aforementioned optical lens assembly, the vertical distance between the farthest point of the effective light entry area on the image-side surface of the fourth lens element and the optical axis is Y42, the distance on the optical axis between the image-side surface of the fourth lens element and the vertical projection from the farthest point on the image-side surface of the fourth lens element to the optical axis is SAG42, the thickness of the fourth lens element on the optical axis is CT4, and they preferably satisfy the relation: −0.45<SAG42/CT4<0.3. When the above relation is satisfied, the curvature of the fourth lens element can avoid being too large, thereby the lens elements can be favorably fabricated and formed. Having satisfied the above relation also facilitates the space reduction required to accommodate the lens elements so that the lens elements can be placed closer together.

In the present optical lens assembly, the lens elements can be made of glass or plastic material. If the lens elements are made of glass, there is more freedom in distributing the refractive power of the optical system. If plastic material is adopted to produce the lens elements, the production cost will be reduced effectively.

In the present optical lens assembly, if a lens element has a convex surface, it means the surface in proximity to the optical axis is convex; if a lens element has a concave surface, it means the surface in proximity to the optical axis is concave.

Figure 20:
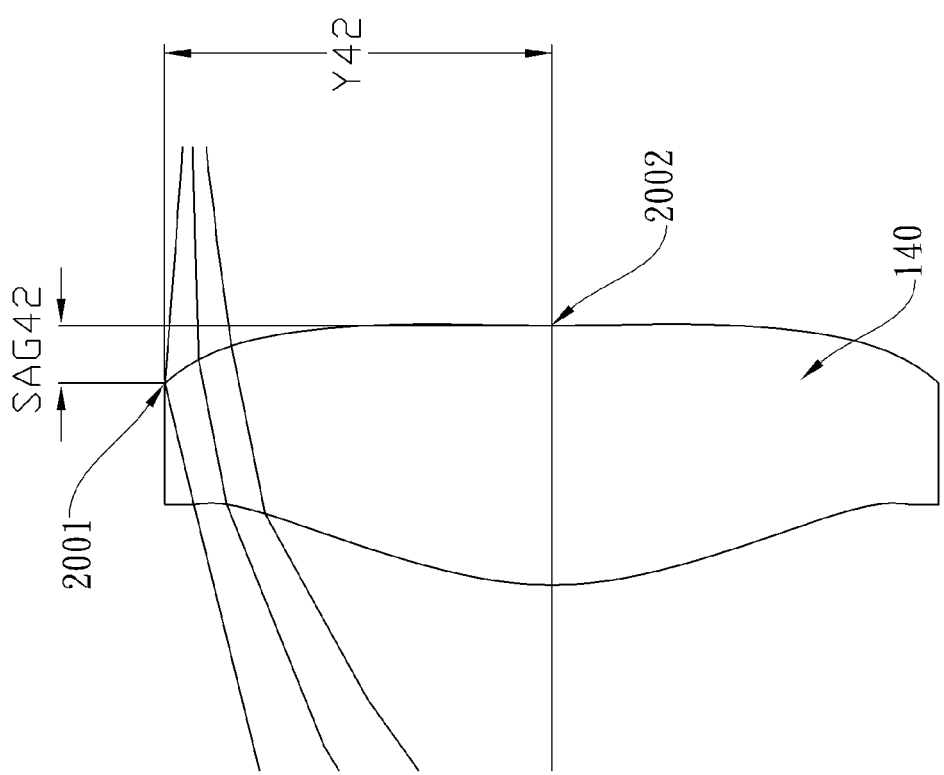
FIG. 20 is an enlarged view of the fourth lens element of FIG. 1A illustrating the vertical distance Y42 between the farthest point of the effective light entry area on the image-side surface of the fourth lens element and the optical axis and the distance SAG42 on the optical axis between the image-side surface of the fourth lens element and the vertical projection of the farthest point on the image-side surface of the fourth lens element on the optical axis.

In the present optical lens assembly, the vertical distance between the farthest point of the effective light entry area on the image-side surface of the fourth lens element and the optical axis is Y42; the distance on the optical axis between the image-side surface of the fourth lens element and the vertical projection from the farthest point on the image-side surface of the fourth lens element to the optical axis is SAG42. The distances and relative locations represented by Y42 and SAG42 will be further illustrated in FIG. 20. FIG. 20 is an enlarged view of the fourth lens element 140 of the first embodiment of the present invention. The vertical distance between the farthest point 2001 of the effective light entry area on the image-side surface 142 of the fourth lens element 140 and the optical axis is Y42; the distance on the optical axis between the intersection 2002 of the image-side surface 142 of the fourth lens element 140 and the vertical projection of the farthest point 2001 on the image-side surface 142 of the fourth lens element 140 on the optical axis is SAG42.

Preferred embodiments of the present invention will be described in the following paragraphs by referring to the accompanying drawings.

Figure 1B:
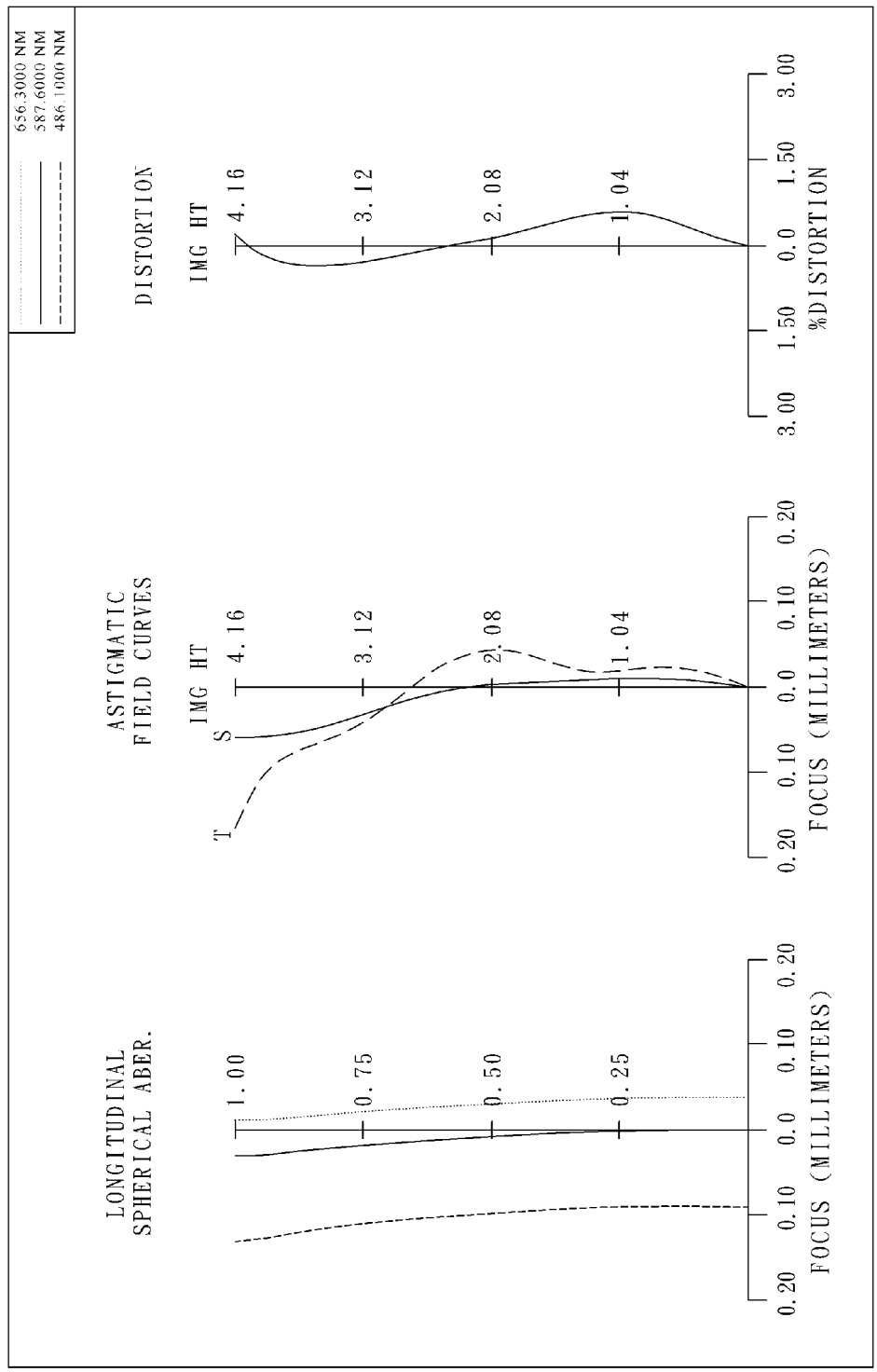
FIG. 1B shows the aberration curves of the first embodiment of the present invention.

FIG. 1A shows an optical lens assembly in accordance with the first embodiment of the present invention, and FIG. 1B shows the aberration curves of the first embodiment of the present invention. In the first embodiment of the present invention, an optical lens assembly mainly comprises four lens elements, in order from an object side to an image side: a plastic first lens element 110 with positive refractive power having a convex object-side surface 111 and a concave image-side surface 112, the object-side and image-side surfaces 111 and 112 thereof being aspheric; a plastic second lens element 120 with positive refractive power having a concave object-side surface 121 and a convex image-side surface 122, the object-side and image-side surfaces 121 and 122 thereof being aspheric; a plastic third lens element 130 with negative refractive power having a concave object-side surface 131 and a convex image-side surface 132, the object-side and image-side surfaces 131 and 132 thereof being aspheric; and a plastic fourth lens element 140 with positive refractive power having a convex object-side surface 141 and a concave image-side surface 142, the object-side and image-side surfaces 141 and 142 thereof being aspheric; wherein an aperture stop 100 is disposed between the first lens element 110 and the second lens element 120 and an image sensor is disposed on an image plane 160 for image formation of an object. The optical lens assembly further comprises an IR-filter 150 and a cover glass 170 sequentially disposed between the image-side surface 142 of the fourth lens element 140 and the image plane 160; the IR-filter 150 is made of glass and has no influence on the focal length of the optical lens assembly.

The equation of the aspheric surface profiles is expressed as follows:

$$X(Y) = (Y^2/R)/\left(1 + (1-(1+k)*(Y/R)^2)^{1/2}\right) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present optical lens assembly, the focal length of the optical lens assembly is f, and it satisfies the relation: f=6.04 (mm).

In the first embodiment of the present optical lens assembly, the f-number of the optical lens assembly is Fno, and it satisfies the relation: Fno=2.55.

In the first embodiment of the present optical lens assembly, half of the maximal field of view of the optical lens assembly is HFOV, and it satisfies the relation: HFOV=34.9 deg.

In the first embodiment of the present optical lens assembly, the thickness of the first lens element 110 on the optical axis is CT1, the thickness of the second lens element 120 on the optical axis is CT2, and they satisfy the relation: CT1/CT2=0.27.

In the first embodiment of the present optical lens assembly, the thickness of the fourth lens element 140 on the optical axis is CT4, the focal length of the optical lens assembly is f, and they satisfy the relation: CT4/f=0.50.

In the first embodiment of the present optical lens assembly, the radius of curvature of the image-side surface 122 of the second lens element 120 is R4, the radius of curvature of the object-side surface 121 of the second lens element 120 is R3, and they satisfy the relation: |R4/R3|=0.69.

In the first embodiment of the present optical lens assembly, the radius of curvature of the object-side surface 141 of the fourth lens element 140 is R7, the radius of curvature of the image-side surface 142 of the fourth lens element 140 is R8, and they satisfy the relation: |R7/R8|=0.15.

In the first embodiment of the present optical lens assembly, the radius of curvature of the object-side surface 131 of the third lens element 130 is R5, the radius of curvature of the image-side surface 132 of the third lens element 130 is R6, and they satisfy the relation: (R5+R6)/(R5−R6)=−4.97.

In the first embodiment of the present optical lens assembly, the focal length of the optical lens assembly is f, the focal length of the first lens element 110 is f1, and they satisfy the relation: f/f1=0.30.

In the first embodiment of the present optical lens assembly, the focal length of the second lens element 120 is f2, the focal length of the fourth lens element 140 is f4, and they satisfy the relation: f2/f4=0.99.

In the first embodiment of the present optical lens assembly, the vertical distance between the farthest point of the effective light entry area on the image-side surface 142 of the fourth lens element 140 and the optical axis is Y42, the distance on the optical axis between the image-side surface 142 of the fourth lens element 140 and the vertical projection from the farthest point on the image-side surface 142 of the fourth lens element 140 to the optical axis is SAG42, the thickness of the fourth lens element 140 on the optical axis is CT4, and they satisfy the relation: SAG42/CT4=−0.22.

In the first embodiment of the present optical lens assembly, the distance on the optical axis between the aperture stop 100 and the image-side surface 142 of the fourth lens element 140 is Sd, the distance on the optical axis between the object-side surface 111 of the first lens element 110 and the image-side surface 142 of the fourth lens element 140 is Td, and they satisfy the relation: Sd/Td=0.90.

In the first embodiment of the present optical lens assembly, the distance on the optical axis between the object-side surface 111 of the first lens element 110 and the image plane is TTL, half of the diagonal length of the effective pixel area of the image sensor is ImgH, and they satisfy the relation: TTL/ImgH=3.42.

The detailed optical data of the first embodiment is shown in FIG. 7 (TABLE 1), and the aspheric surface data is shown in FIG. 8 (TABLE 2), wherein the units of the radius of curvature, the thickness and the focal length are expressed in mm, and HFOV is half of the maximal field of view.

Figure 2A:
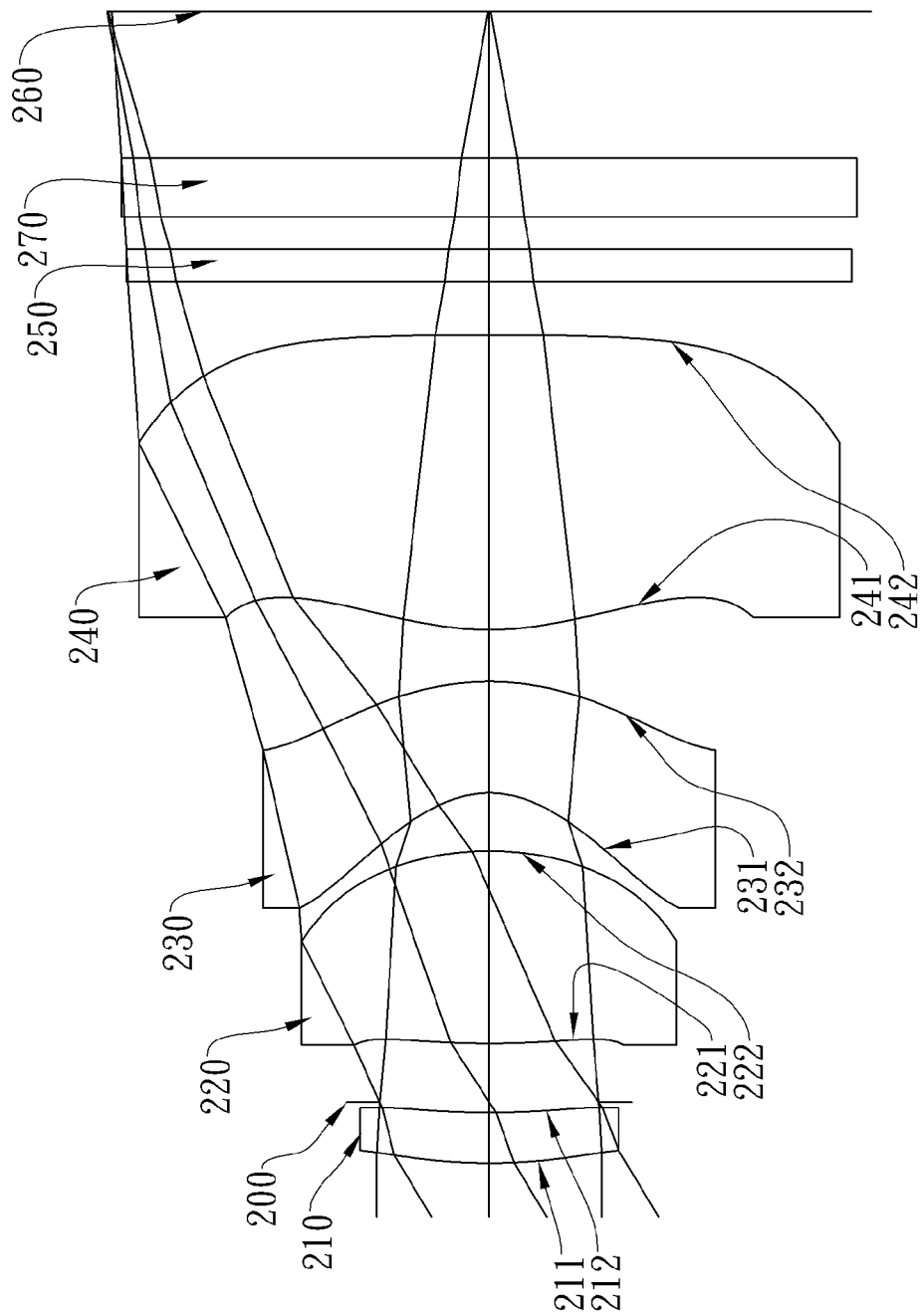
FIG. 2A shows an optical lens assembly in accordance with the second embodiment of the present invention.
Figure 2B:
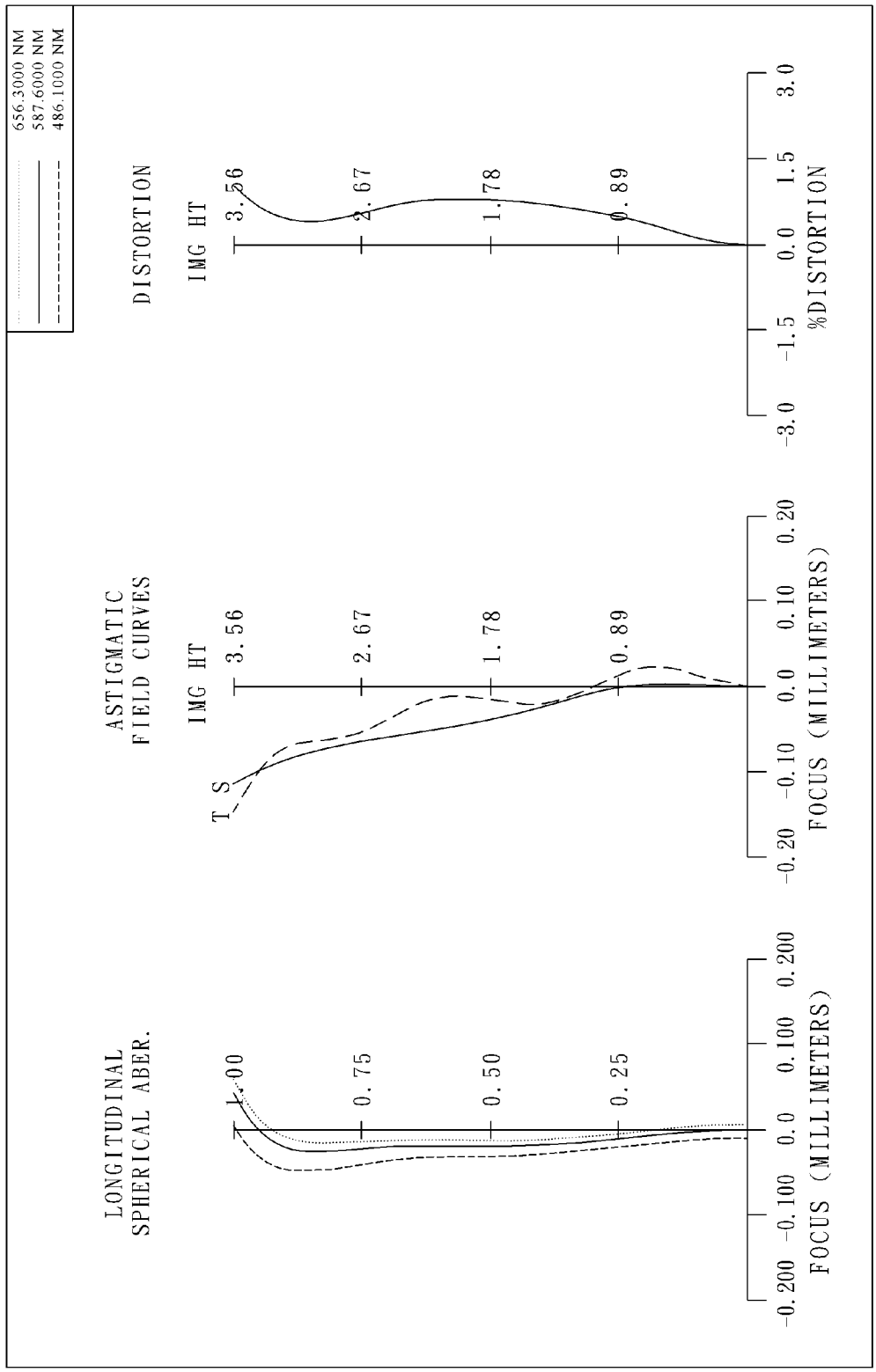
FIG. 2B shows the aberration curves of the second embodiment of the present invention.

FIG. 2A shows an optical lens assembly in accordance with the second embodiment of the present invention, and FIG. 2B shows the aberration curves of the second embodiment of the present invention. In the second embodiment of the present invention, an optical lens assembly mainly comprises four lens elements, in order from an object side to an image side: a plastic first lens element 210 with positive refractive power having a convex object-side surface 211 and a concave image-side surface 212, the object-side and image-side surfaces 211 and 212 thereof being aspheric; a plastic second lens element 220 with positive refractive power having a convex object-side surface 221 and a convex image-side surface 222, the object-side and image-side surfaces 221 and 222 thereof being aspheric; a plastic third lens element 230 with negative refractive power having a concave object-side surface 231 and a convex image-side surface 232, the object-side and image-side surfaces 231 and 232 thereof being aspheric; and a plastic fourth lens element 240 with positive refractive power having a convex object-side surface 241 and a convex image-side surface 242, the object-side and image-side surfaces 241 and 242 thereof being aspheric; wherein an aperture stop 200 is disposed between the first lens element 210 and the second lens element 220 and an image sensor is disposed on an image plane 260 for image formation of an object. The optical lens assembly further comprises an IR-filter 250 and a cover glass 270 sequentially disposed between the image-side surface 242 of the fourth lens element 240 and the image plane 260; the IR-filter 250 is made of glass and has no influence on the focal length of the optical lens assembly.

The equation of the aspheric surface profiles of the second embodiment has the same form as that of the first embodiment.

In the second embodiment of the present optical lens assembly, the focal length of the optical lens assembly is f, and it satisfies the relation: f=5.88 (mm).

In the second embodiment of the present optical lens assembly, the f-number of the optical lens assembly is Fno, and it satisfies the relation: Fno=2.80.

In the second embodiment of the present optical lens assembly, half of the maximal field of view of the optical lens assembly is HFOV, and it satisfies the relation: HFOV=31.0 deg.

In the second embodiment of the present optical lens assembly, the thickness of the first lens element 210 on the optical axis is CT1, the thickness of the second lens element 220 on the optical axis is CT2, and they satisfy the relation: CT1/CT2=0.26.

In the second embodiment of the present optical lens assembly, the thickness of the fourth lens element 240 on the optical axis is CT4, the focal length of the optical lens assembly is f, and they satisfy the relation: CT4/f=0.47.

In the second embodiment of the present optical lens assembly, the radius of curvature of the image-side surface 222 of the second lens element 220 is R4, the radius of curvature of the object-side surface 221 of the second lens element 220 is R3, and they satisfy the relation: |R4/R3|=0.36.

In the second embodiment of the present optical lens assembly, the radius of curvature of the object-side surface 241 of the fourth lens element 240 is R7, the radius of curvature of the image-side surface 242 of the fourth lens element 240 is R8, and they satisfy the relation: |R7/R8|=0.04.

In the second embodiment of the present optical lens assembly, the radius of curvature of the object-side surface 231 of the third lens element 230 is R5, the radius of curvature of the image-side surface 232 of the third lens element 230 is R6, and they satisfy the relation: (R5+R6)/(R5−R6)=−2.17.

In the second embodiment of the present optical lens assembly, the focal length of the optical lens assembly is f, the focal length of the first lens element 210 is f1, and they satisfy the relation: f/f1=0.26.

In the second embodiment of the present optical lens assembly, the focal length of the second lens element 220 is f2, the focal length of the fourth lens element 240 is f4, and they satisfy the relation: f2/f4=0.80.

In the second embodiment of the present optical lens assembly, the vertical distance between the farthest point of the effective light entry area on the image-side surface 242 of the fourth lens element 240 and the optical axis is Y42, the distance on the optical axis between the image-side surface 242 of the fourth lens element 240 and the vertical projection from the farthest point on the image-side surface 242 of the fourth lens element 240 to the optical axis is SAG42, the thickness of the fourth lens element 240 on the optical axis is CT4, and they satisfy the relation: SAG42/CT4=−0.36.

In the second embodiment of the present optical lens assembly, the distance on the optical axis between the aperture stop 200 and the image-side surface 242 of the fourth lens element 240 is Sd, the distance on the optical axis between the object-side surface 211 of the first lens element 210 and the image-side surface 242 of the fourth lens element 240 is Td, and they satisfy the relation: Sd/Td=0.93.

In the second embodiment of the present optical lens assembly, the distance on the optical axis between the object-side surface 211 of the first lens element 210 and the image plane is TTL, half of the diagonal length of the effective pixel area of the image sensor is ImgH, and they satisfy the relation: TTL/ImgH=2.94.

The detailed optical data of the second embodiment is shown in FIG. 9 (TABLE 3), and the aspheric surface data is shown in FIG. 10 (TABLE 4), wherein the units of the radius of curvature, the thickness and the focal length are expressed in mm, and HFOV is half of the maximal field of view.

Figure 3A:
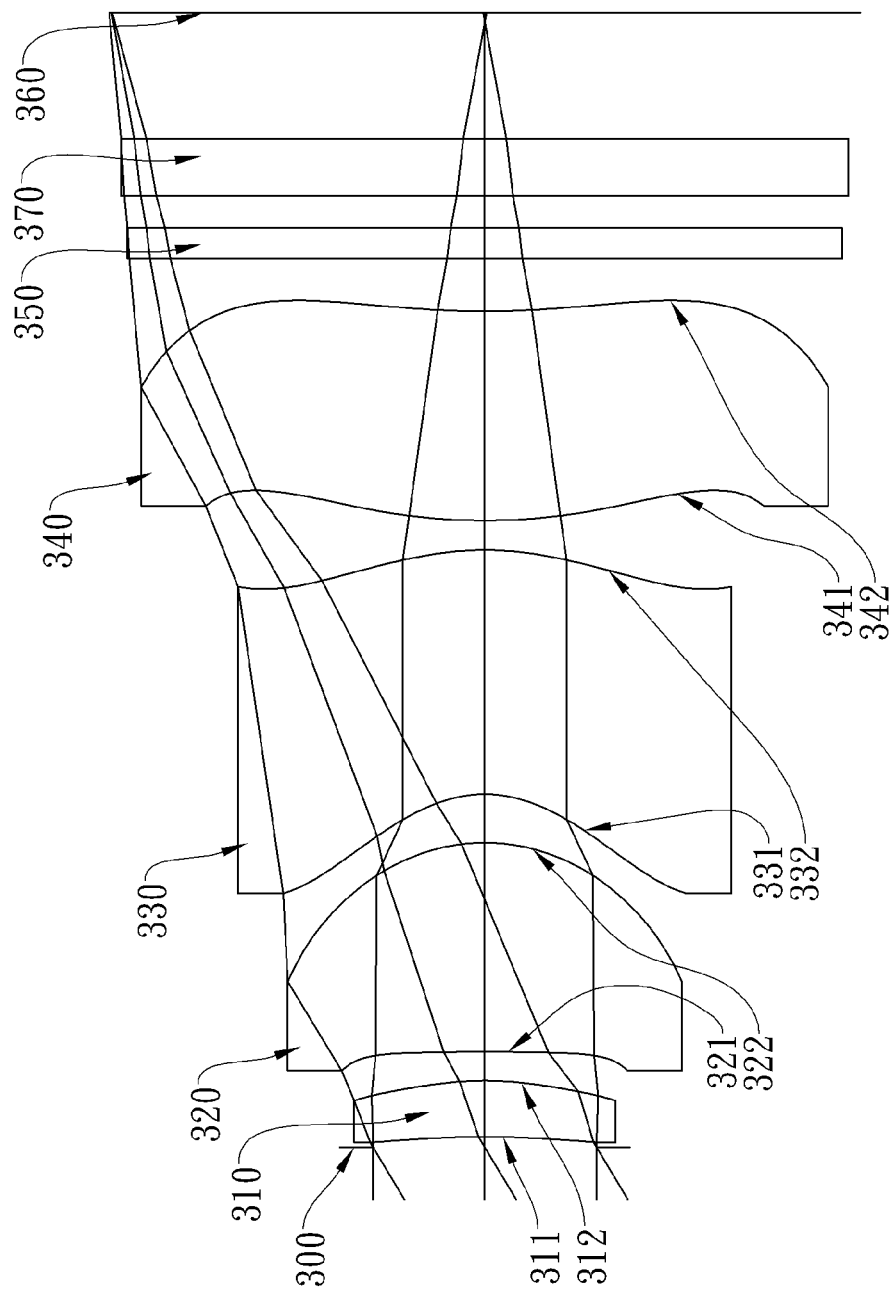
FIG. 3A shows an optical lens assembly in accordance with the third embodiment of the present invention.
Figure 3B:
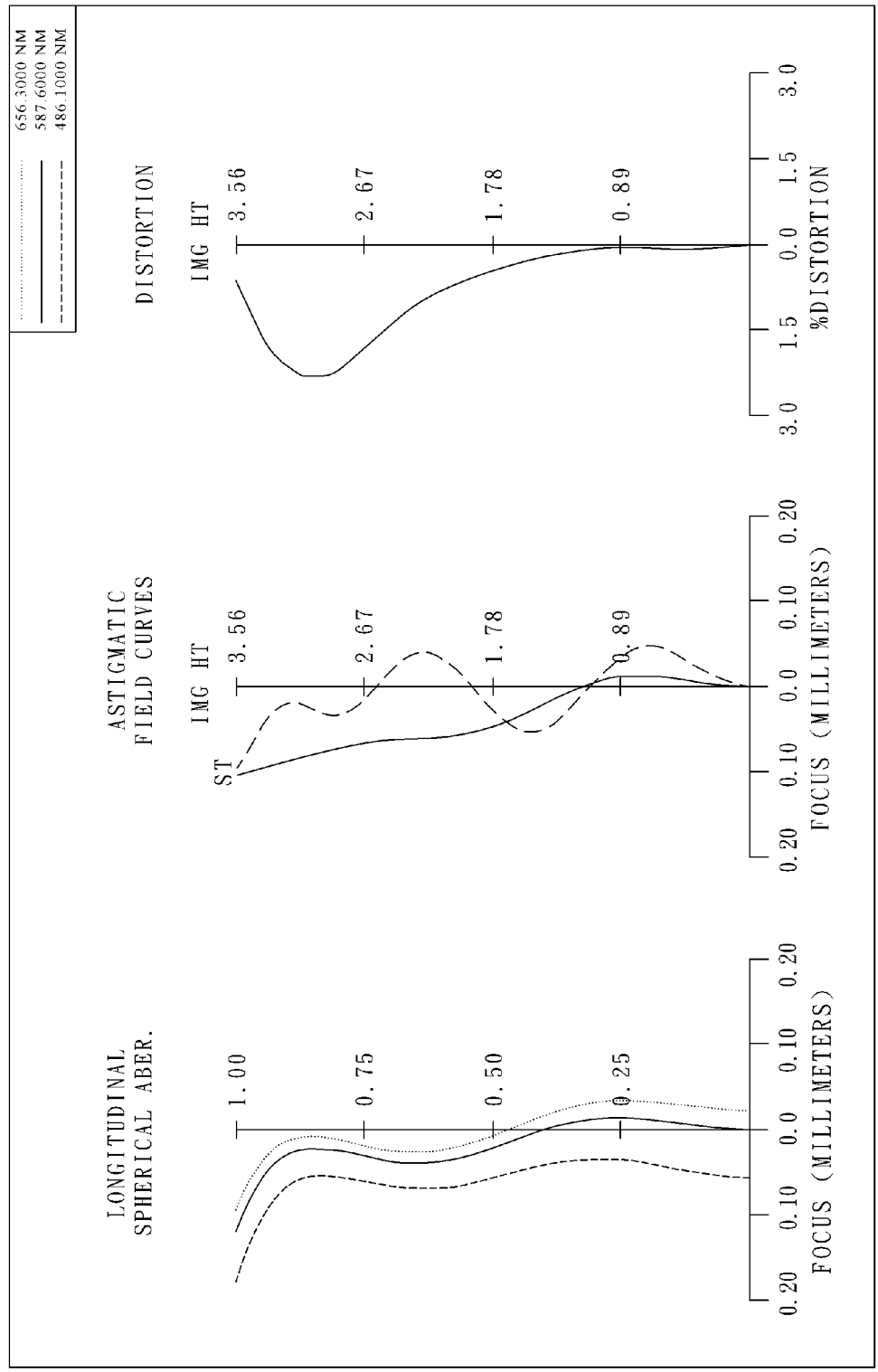
FIG. 3B shows the aberration curves of the third embodiment of the present invention.

FIG. 3A shows an optical lens assembly in accordance with the third embodiment of the present invention, and FIG. 3B shows the aberration curves of the third embodiment of the present invention. In the third embodiment of the present invention, an optical lens assembly mainly comprises four lens elements, in order from an object side to an image side: a plastic first lens element 310 with positive refractive power having a concave object-side surface 311 and a convex image-side surface 312, the object-side and image-side surfaces 311 and 312 thereof being aspheric; a plastic second lens element 320 with positive refractive power having a concave object-side surface 321 and a convex image-side surface 322, the object-side and image-side surfaces 321 and 322 thereof being aspheric; a plastic third lens element 330 with negative refractive power having a concave object-side surface 331 and a convex image-side surface 332, the object-side and image-side surfaces 331 and 332 thereof being aspheric; and a plastic fourth lens element 340 with positive refractive power having a convex object-side surface 341 and a concave image-side surface 342, the object-side and image-side surfaces 341 and 342 thereof being aspheric; wherein an aperture stop 300 is disposed between an object and the first lens element 310 and an image sensor is disposed on an image plane 360 for image formation of the object. The optical lens assembly further comprises an IR-filter 350 and a cover glass 370 sequentially disposed between the image-side surface 342 of the fourth lens element 340 and the image plane 360; the IR-filter 350 is made of glass and has no influence on the focal length of the optical lens assembly.

The equation of the aspheric surface profiles of the third embodiment has the same form as that of the first embodiment.

In the third embodiment of the present optical lens assembly, the focal length of the optical lens assembly is f, and it satisfies the relation: f=5.99 (mm).

In the third embodiment of the present optical lens assembly, the f-number of the optical lens assembly is Fno, and it satisfies the relation: Fno=2.80.

In the third embodiment of the present optical lens assembly, half of the maximal field of view of the optical lens assembly is HFOV, and it satisfies the relation: HFOV=31.0 deg.

In the third embodiment of the present optical lens assembly, the thickness of the first lens element 310 on the optical axis is CT1, the thickness of the second lens element 320 on the optical axis is CT2, and they satisfy the relation: CT1/CT2=0.27.

In the third embodiment of the present optical lens assembly, the thickness of the fourth lens element 340 on the optical axis is CT4, the focal length of the optical lens assembly is f, and they satisfy the relation: CT4/f=0.33.

In the third embodiment of the present optical lens assembly, the radius of curvature of the image-side surface 322 of the second lens element 320 is R4, the radius of curvature of the object-side surface 321 of the second lens element 320 is R3, and they satisfy the relation: |R4/R3|=0.12.

In the third embodiment of the present optical lens assembly, the radius of curvature of the object-side surface 341 of the fourth lens element 340 is R7, the radius of curvature of the image-side surface 342 of the fourth lens element 340 is R8, and they satisfy the relation: |R7/R8|=0.86.

In the third embodiment of the present optical lens assembly, the radius of curvature of the object-side surface 331 of the third lens element 330 is R5, the radius of curvature of the image-side surface 332 of the third lens element 330 is R6, and they satisfy the relation: (R5+R6)/(R5−R6)=−2.37.

In the third embodiment of the present optical lens assembly, the focal length of the optical lens assembly is f, the focal length of the first lens element 310 is f1, and they satisfy the relation: f/f1=0.78.

In the third embodiment of the present optical lens assembly, the focal length of the second lens element 320 is f2, the focal length of the fourth lens element 340 is f4, and they satisfy the relation: f2/f4=0.08.

In the third embodiment of the present optical lens assembly, the vertical distance between the farthest point of the effective light entry area on the image-side surface 342 of the fourth lens element 340 and the optical axis is Y42, the distance on the optical axis between the image-side surface 342 of the fourth lens element 340 and the vertical projection from the farthest point on the image-side surface 342 of the fourth lens element 340 to the optical axis is SAG42, the thickness of the fourth lens element 340 on the optical axis is CT4, and they satisfy the relation: SAG42/CT4=−0.36.

In the third embodiment of the present optical lens assembly, the distance on the optical axis between the aperture stop 300 and the image-side surface 342 of the fourth lens element 340 is Sd, the distance on the optical axis between the object-side surface 311 of the first lens element 310 and the image-side surface 342 of the fourth lens element 340 is Td, and they satisfy the relation: Sd/Td=1.01.

In the third embodiment of the present optical lens assembly, the distance on the optical axis between the object-side surface 311 of the first lens element 310 and the image plane is TTL, half of the diagonal length of the effective pixel area of the image sensor is ImgH, and they satisfy the relation: TTL/ImgH=2.94.

The detailed optical data of the third embodiment is shown in FIG. 11 (TABLE 5), and the aspheric surface data is shown in FIG. 12 (TABLE 6), wherein the units of the radius of curvature, the thickness and the focal length are expressed in mm, and HFOV is half of the maximal field of view.

Figure 4A:
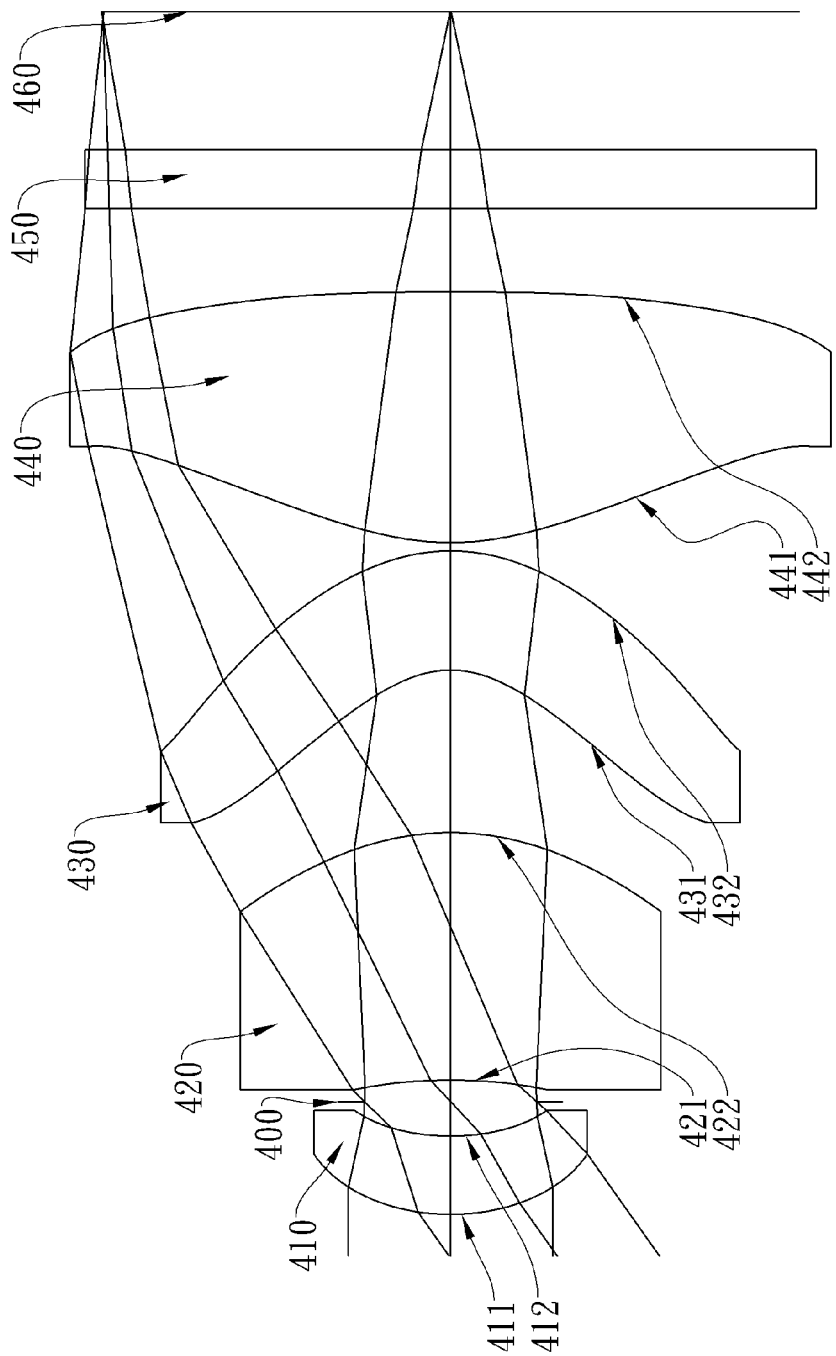
FIG. 4A shows an optical lens assembly in accordance with the fourth embodiment of the present invention.
Figure 4B:
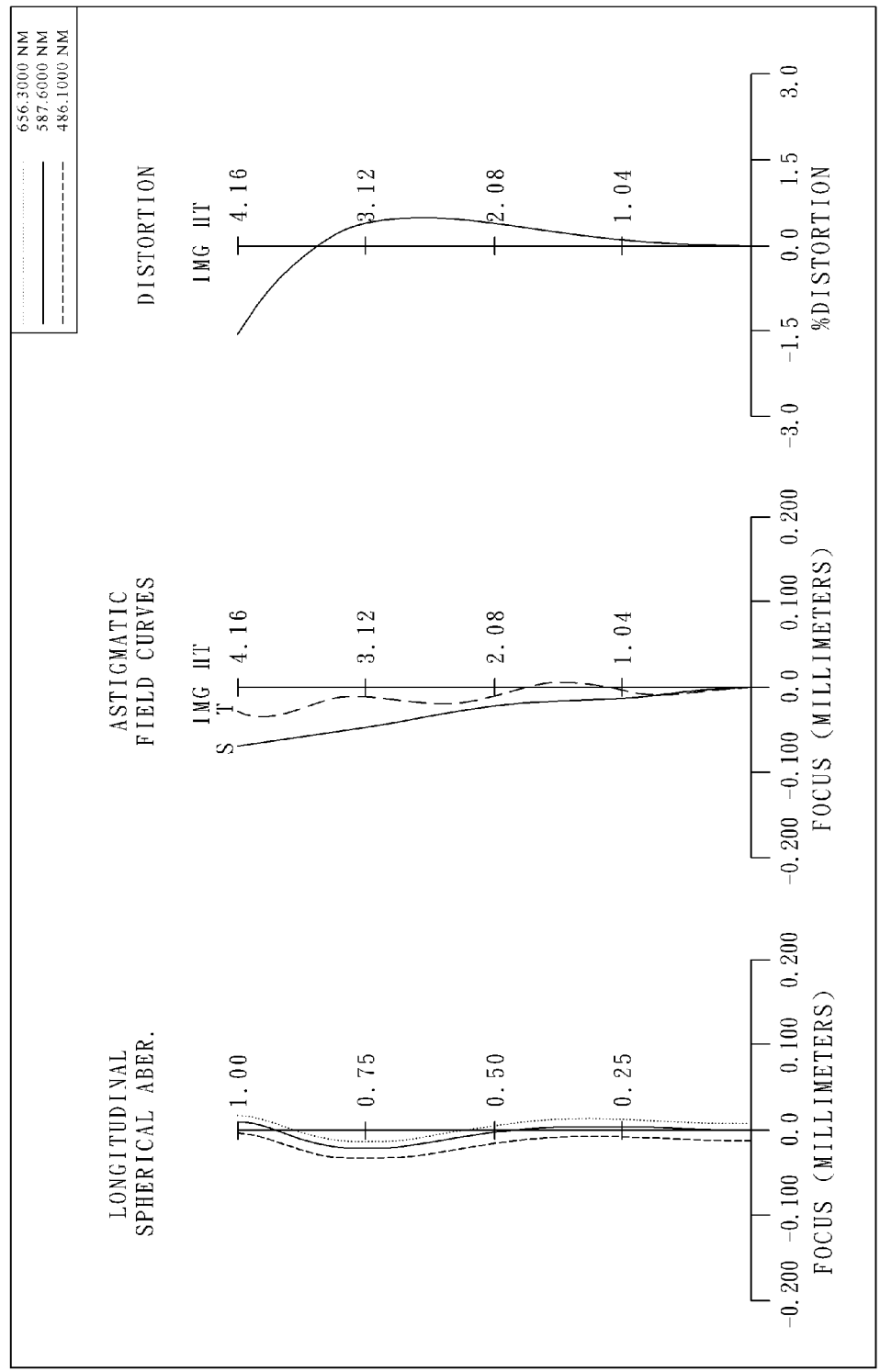
FIG. 4B shows the aberration curves of the fourth embodiment of the present invention.

FIG. 4A shows an optical lens assembly in accordance with the fourth embodiment of the present invention, and FIG. 4B shows the aberration curves of the fourth embodiment of the present invention. In the fourth embodiment of the present invention, an optical lens assembly mainly comprises four lens elements, in order from an object side to an image side: a plastic first lens element 410 with positive refractive power having a convex object-side surface 411 and a concave image-side surface 412, the object-side and image-side surfaces 411 and 412 thereof being aspheric; a plastic second lens element 420 with positive refractive power having a concave object-side surface 421 and a convex image-side surface 422, the object-side and image-side surfaces 421 and 422 thereof being aspheric; a plastic third lens element 430 with negative refractive power having a concave object-side surface 431 and a convex image-side surface 432, the object-side and image-side surfaces 431 and 432 thereof being aspheric; and a plastic fourth lens element 440 with positive refractive power having a convex object-side surface 441 and a convex image-side surface 442, the object-side and image-side surfaces 441 and 442 thereof being aspheric; wherein an aperture stop 400 is disposed between the first lens element 410 and the second lens element 420 and an image sensor is disposed on an image plane 460 for image formation of an object. The optical lens assembly further comprises an IR-filter 450 disposed between the image-side surface 442 of the fourth lens element 440 and the image plane 460; the IR-filter 450 is made of glass and has no influence on the focal length of the optical lens assembly.

The equation of the aspheric surface profiles of the fourth embodiment has the same form as that of the first embodiment.

In the fourth embodiment of the present optical lens assembly, the focal length of the optical lens assembly is f, and it satisfies the relation: f=6.00 (mm).

In the fourth embodiment of the present optical lens assembly, the f-number of the optical lens assembly is Fno, and it satisfies the relation: Fno=2.45.

In the fourth embodiment of the present optical lens assembly, half of the maximal field of view of the optical lens assembly is HFOV, and it satisfies the relation: HFOV=35.7 deg.

In the fourth embodiment of the present optical lens assembly, the thickness of the first lens element 410 on the optical axis is CT1, the thickness of the second lens element 420 on the optical axis is CT2, and they satisfy the relation: CT1/CT2=0.32.

In the fourth embodiment of the present optical lens assembly, the thickness of the fourth lens element 440 on the optical axis is CT4, the focal length of the optical lens assembly is f, and they satisfy the relation: CT4/f=0.50.

In the fourth embodiment of the present optical lens assembly, the radius of curvature of the image-side surface 422 of the second lens element 420 is R4, the radius of curvature of the object-side surface 421 of the second lens element 420 is R3, and they satisfy the relation: |R4/R3|=0.48.

In the fourth embodiment of the present optical lens assembly, the radius of curvature of the object-side surface 441 of the fourth lens element 440 is R7, the radius of curvature of the image-side surface 442 of the fourth lens element 440 is R8, and they satisfy the relation: |R7/R8|=0.03.

In the fourth embodiment of the present optical lens assembly, the radius of curvature of the object-side surface 431 of the third lens element 430 is R5, the radius of curvature of the image-side surface 432 of the third lens element 430 is R6, and they satisfy the relation: (R5+R6)/(R5−R6)=−3.24.

In the fourth embodiment of the present optical lens assembly, the focal length of the optical lens assembly is f, the focal length of the first lens element 410 is f1, and they satisfy the relation: f/f1=0.18.

In the fourth embodiment of the present optical lens assembly, the focal length of the second lens element 420 is f2, the focal length of the fourth lens element 440 is f4, and they satisfy the relation: f2/f4=1.30.

In the fourth embodiment of the present optical lens assembly, the vertical distance between the farthest point of the effective light entry area on the image-side surface 442 of the fourth lens element 440 and the optical axis is Y42, the distance on the optical axis between the image-side surface 442 of the fourth lens element 440 and the vertical projection from the farthest point on the image-side surface 442 of the fourth lens element 440 to the optical axis is SAG42, the thickness of the fourth lens element 440 on the optical axis is CT4, and they satisfy the relation: SAG42/CT4=−0.24.

In the fourth embodiment of the present optical lens assembly, the distance on the optical axis between the aperture stop 400 and the image-side surface 442 of the fourth lens element 440 is Sd, the distance on the optical axis between the object-side surface 411 of the first lens element 410 and the image-side surface 442 of the fourth lens element 440 is Td, and they satisfy the relation: Sd/Td=0.88.

In the fourth embodiment of the present optical lens assembly, the distance on the optical axis between the object-side surface 411 of the first lens element 410 and the image plane is TTL, half of the diagonal length of the effective pixel area of the image sensor is ImgH, and they satisfy the relation: TTL/ImgH=3.41.

The detailed optical data of the fourth embodiment is shown in FIG. 13 (TABLE 7), and the aspheric surface data is shown in FIG. 14 (TABLE 8), wherein the units of the radius of curvature, the thickness and the focal length are expressed in mm, and HFOV is half of the maximal field of view.

Figure 5A:
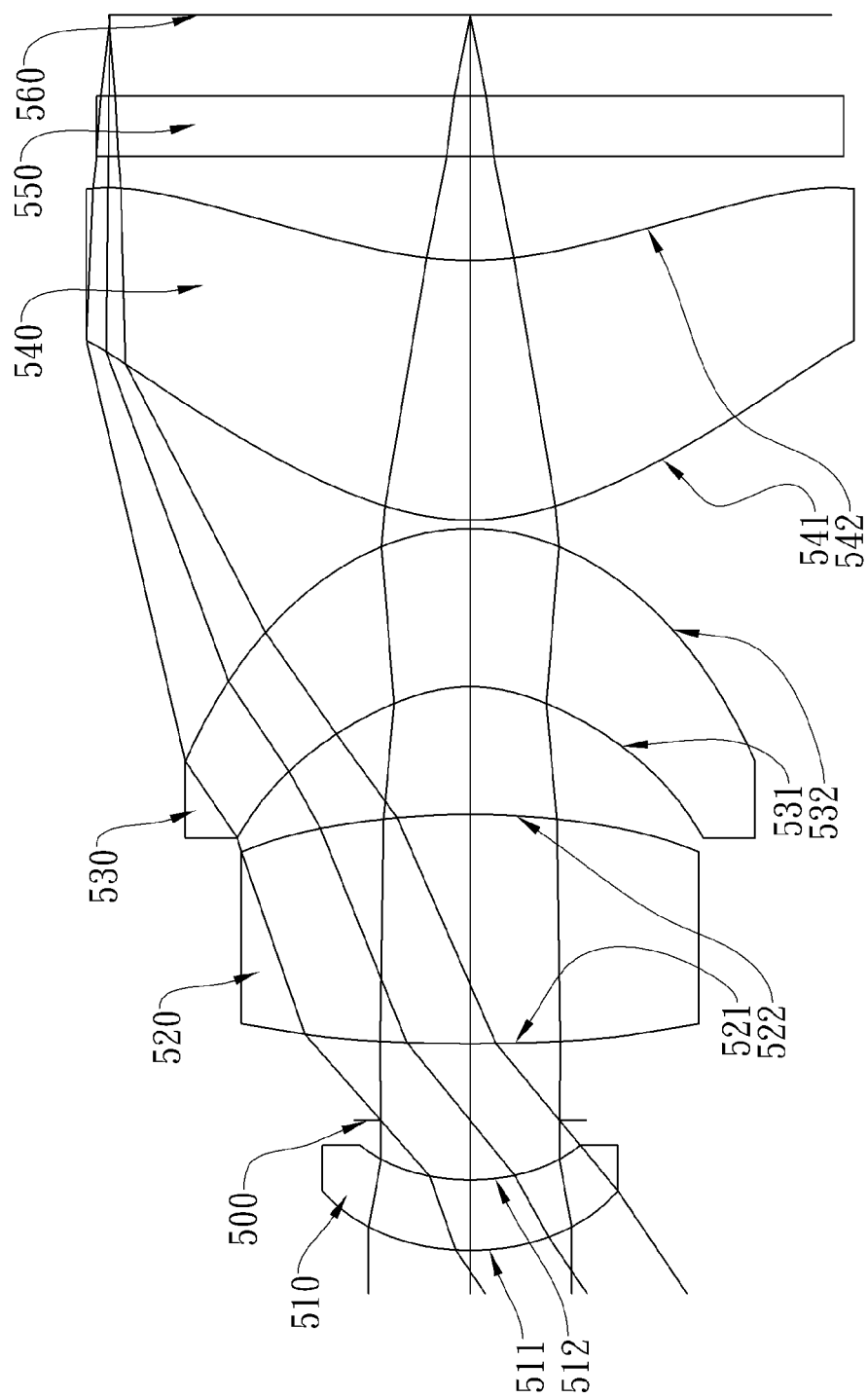
FIG. 5A shows an optical lens assembly in accordance with the fifth embodiment of the present invention.
Figure 5B:
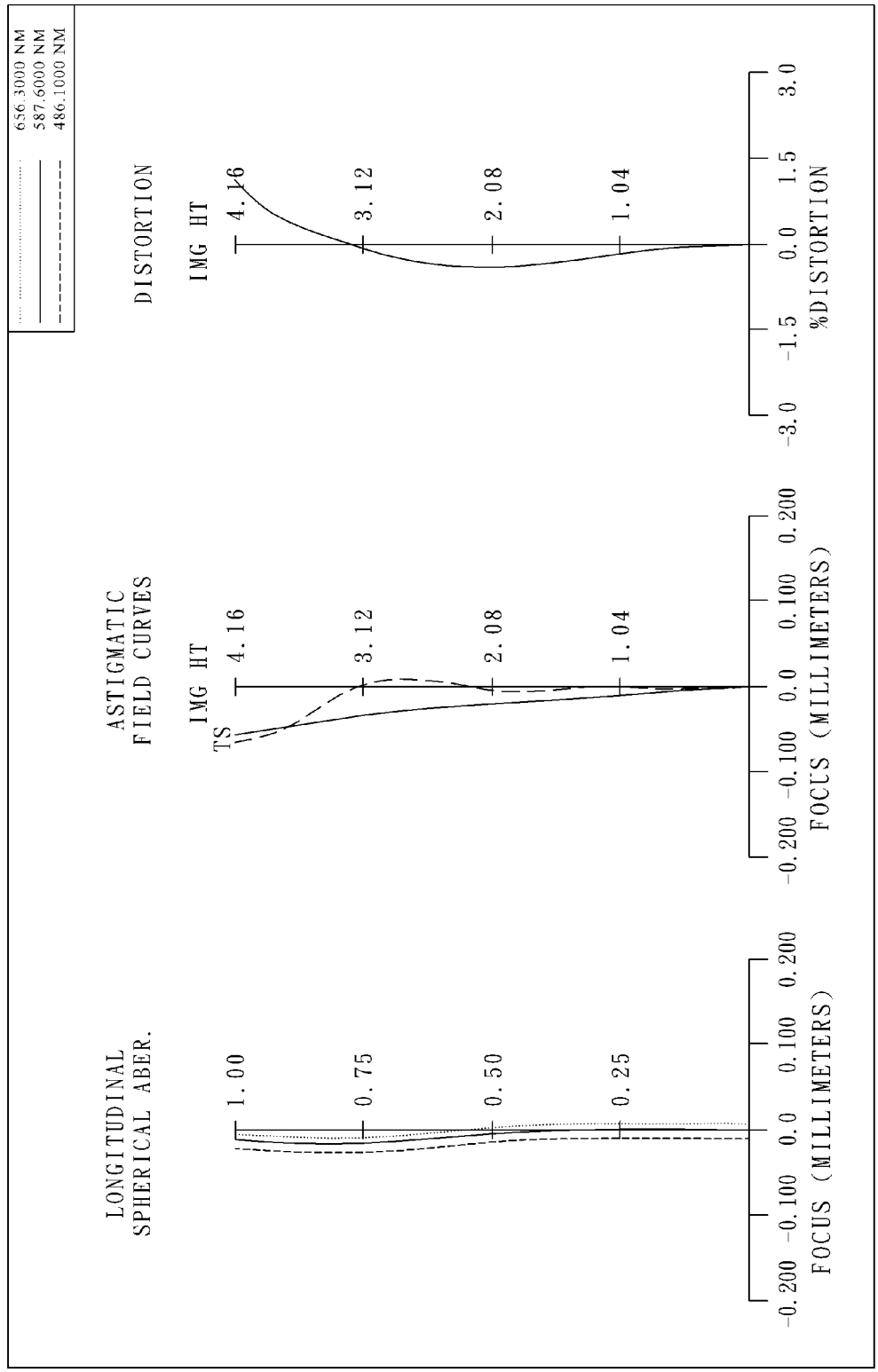
FIG. 5B shows the aberration curves of the fifth embodiment of the present invention.

FIG. 5A shows an optical lens assembly in accordance with the fifth embodiment of the present invention, and FIG. 5B shows the aberration curves of the fifth embodiment of the present invention. In the fifth embodiment of the present invention, an optical lens assembly mainly comprises four lens elements, in order from an object side to an image side: a plastic first lens element 510 with positive refractive power having a convex object-side surface 511 and a concave image-side surface 512, the object-side and image-side surfaces 511 and 512 thereof being aspheric; a plastic second lens element 520 with positive refractive power having a convex object-side surface 521 and a convex image-side surface 522, the object-side and image-side surfaces 521 and 522 thereof being aspheric; a plastic third lens element 530 with negative refractive power having a concave object-side surface 531 and a convex image-side surface 532, the object-side and image-side surfaces 531 and 532 thereof being aspheric; and a plastic fourth lens element 540 with positive refractive power having a convex object-side surface 541 and a concave image-side surface 542, the object-side and image-side surfaces 541 and 542 thereof being aspheric; wherein an aperture stop 500 is disposed between the first lens element 510 and the second lens element 520 and an image sensor is disposed on an image plane 560 for image formation of an object. The optical lens assembly further comprises an IR-filter 550 disposed between the image-side surface 542 of the fourth lens element 540 and the image plane 560; the IR-filter 550 is made of glass and has no influence on the focal length of the optical lens assembly.

The equation of the aspheric surface profiles of the fifth embodiment has the same form as that of the first embodiment.

In the fifth embodiment of the present optical lens assembly, the focal length of the optical lens assembly is f, and it satisfies the relation: f=6.12 (mm).

In the fifth embodiment of the present optical lens assembly, the f-number of the optical lens assembly is Fno, and it satisfies the relation: Fno=2.60.

In the fifth embodiment of the present optical lens assembly, half of the maximal field of view of the optical lens assembly is HFOV, and it satisfies the relation: HFOV=34.3 deg.

In the fifth embodiment of the present optical lens assembly, the thickness of the first lens element 510 on the optical axis is CT1, the thickness of the second lens element 520 on the optical axis is CT2, and they satisfy the relation: CT1/CT2=0.31.

In the fifth embodiment of the present optical lens assembly, the thickness of the fourth lens element 540 on the optical axis is CT4, the focal length of the optical lens assembly is f, and they satisfy the relation: CT4/f=0.49.

In the fifth embodiment of the present optical lens assembly, the radius of curvature of the image-side surface 522 of the second lens element 520 is R4, the radius of curvature of the object-side surface 521 of the second lens element 520 is R3 and they satisfy the relation: |R4/R3|=0.46.

In the fifth embodiment of the present optical lens assembly, the radius of curvature of the object-side surface 541 of the fourth lens element 540 is R7, the radius of curvature of the image-side surface 542 of the fourth lens element 540 is R8, and they satisfy the relation: |R7/R8|=0.68.

In the fifth embodiment of the present optical lens assembly, the radius of curvature of the object-side surface 531 of the third lens element 530 is R5, the radius of curvature of the image-side surface 532 of the third lens element 530 is R6, and they satisfy the relation: (R5+R6)/(R5−R6)=−6.37.

In the fifth embodiment of the present optical lens assembly, the focal length of the optical lens assembly is f, the focal length of the first lens element 510 is f1, and they satisfy the relation: f/f1=0.01.

In the fifth embodiment of the present optical lens assembly, the focal length of the second lens element 520 is f2, the focal length of the fourth lens element 540 is f4, and they satisfy the relation: f2/f4=1.10.

In the fifth embodiment of the present optical lens assembly, the vertical distance between the farthest point of the effective light entry area on the image-side surface 542 of the fourth lens element 540 and the optical axis is Y42, the distance on the optical axis between the image-side surface 542 of the fourth lens element 540 and the vertical projection from the farthest point on the image-side surface 542 of the fourth lens element 540 to the optical axis is SAG42, the thickness of the fourth lens element 540 on the optical axis is CT4, and they satisfy the relation: SAG42/CT4=0.28.

In the fifth embodiment of the present optical lens assembly, the distance on the optical axis between the aperture stop 500 and the image-side surface 542 of the fourth lens element 540 is Sd, the distance on the optical axis between the object-side surface 511 of the first lens element 510 and the image-side surface 542 of the fourth lens element 540 is Td, and they satisfy the relation: Sd/Td=0.87.

In the fifth embodiment of the present optical lens assembly, the distance on the optical axis between the object-side surface 511 of the first lens element 510 and the image plane is TTL, half of the diagonal length of the effective pixel area of the image sensor is ImgH, and they satisfy the relation: TTL/ImgH=3.38.

The detailed optical data of the fifth embodiment is shown in FIG. 15 (TABLE 9), and the aspheric surface data is shown in FIG. 16 (TABLE 10), wherein the units of the radius of curvature, the thickness and the focal length are expressed in mm, and HFOV is half of the maximal field of view.

Figure 6A:
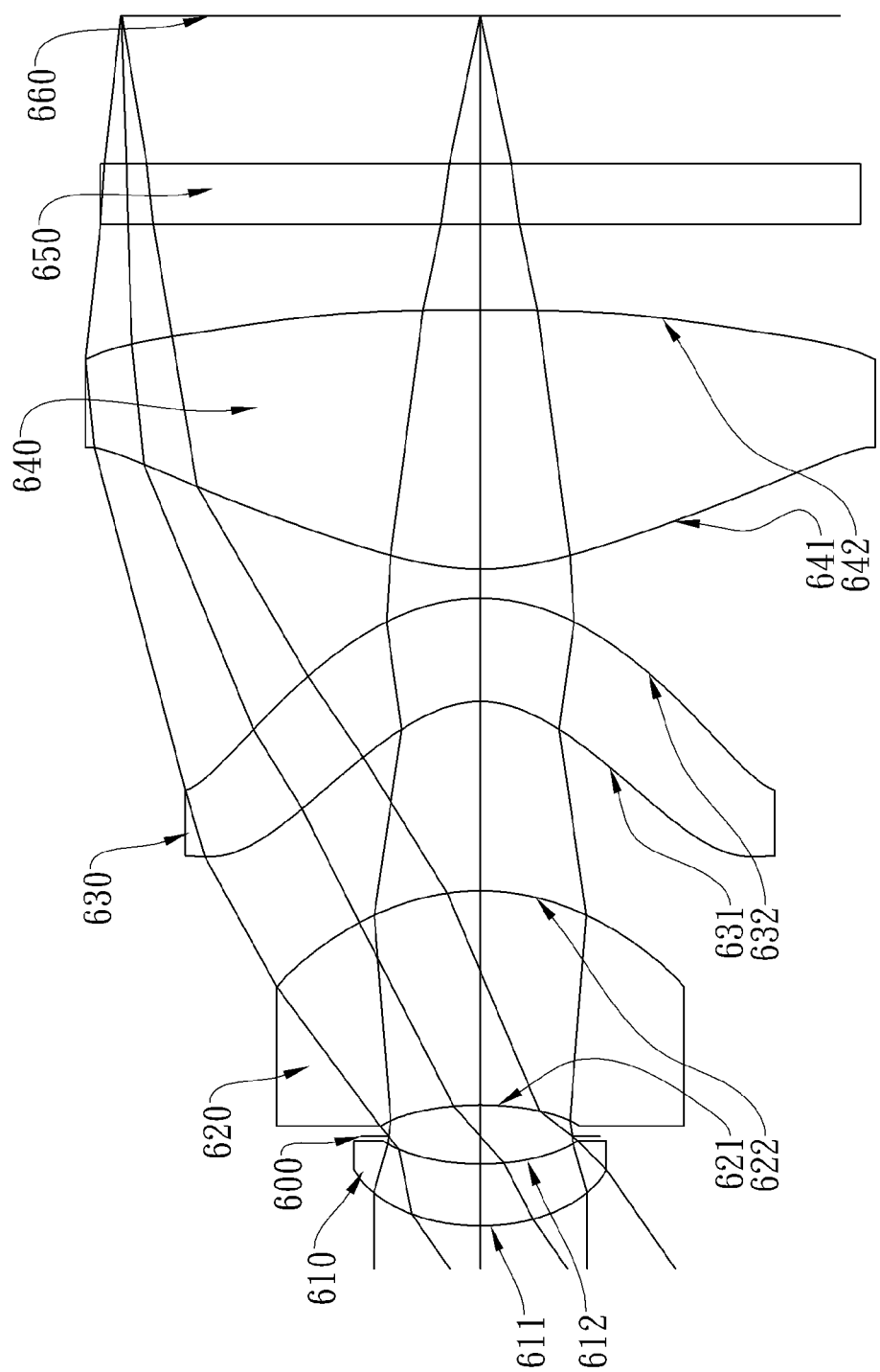
FIG. 6A shows an optical lens assembly in accordance with the sixth embodiment of the present invention.
Figure 6B:
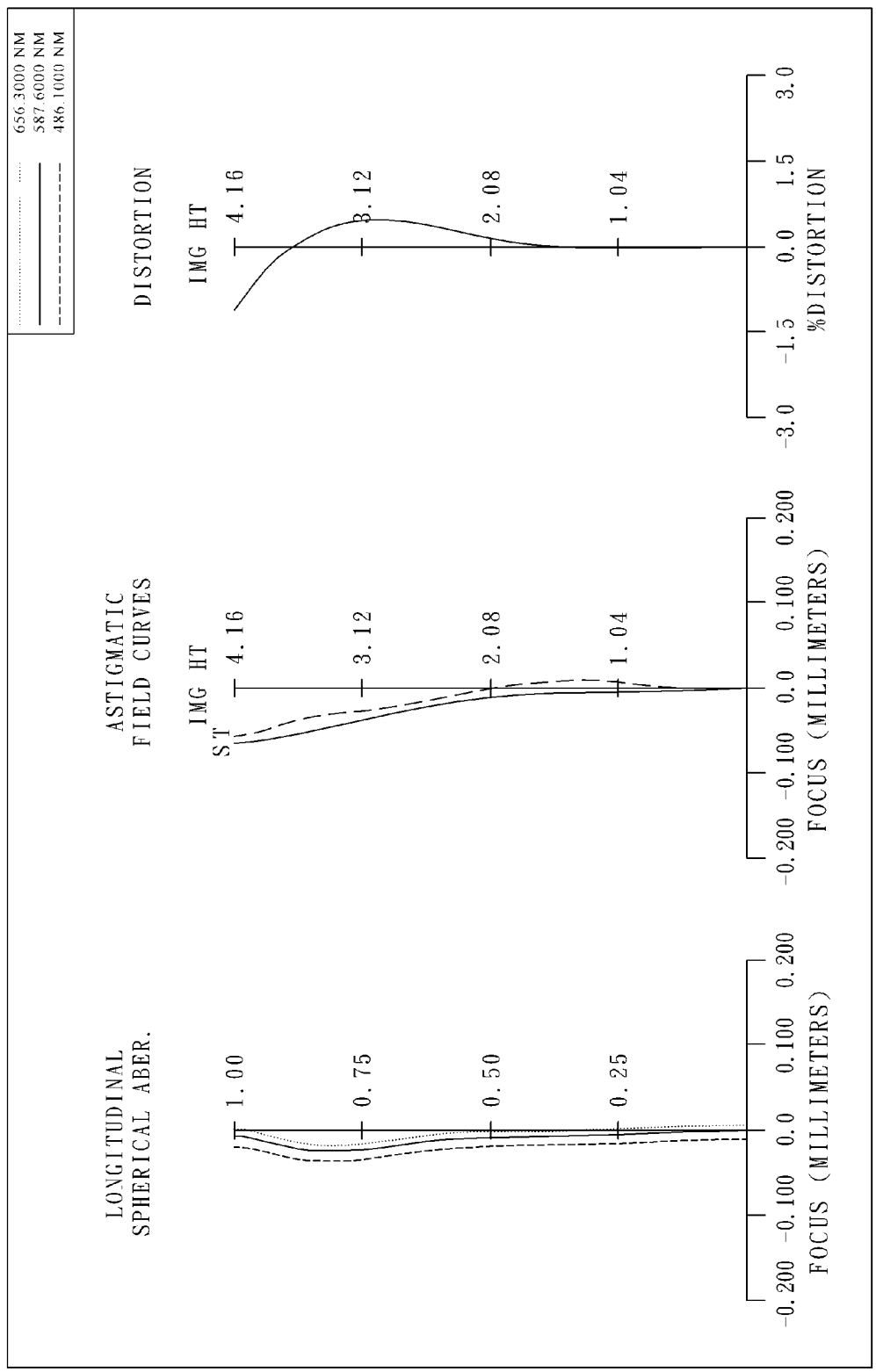
FIG. 6B shows the aberration curves of the sixth embodiment of the present invention.

FIG. 6A shows an optical lens assembly in accordance with the sixth embodiment of the present invention, and FIG. 6B shows the aberration curves of the sixth embodiment of the present invention. In the sixth embodiment of the present invention, an optical lens assembly mainly comprises four lens elements, in order from an object side to an image side: a plastic first lens element 610 with positive refractive power having a convex object-side surface 611 and a concave image-side surface 612, the object-side and image-side surfaces 611 and 612 thereof being aspheric; a plastic second lens element 620 with positive refractive power having a concave object-side surface 621 and a convex image-side surface 622, the object-side and image-side surfaces 621 and 622 thereof being aspheric; a plastic third lens element 630 with negative refractive power having a concave object-side surface 631 and a convex image-side surface 632, the object-side and image-side surfaces 631 and 632 thereof being aspheric; and a plastic fourth lens element 640 with positive refractive power having a convex object-side surface 641 and a convex image-side surface 642, the object-side and image-side surfaces 641 and 642 thereof being aspheric; wherein an aperture stop 600 is disposed between the first lens element 610 and the second lens element 620 and an image sensor is disposed on an image plane 660 for image formation of an object. The optical lens assembly further comprises an IR-filter 650 disposed between the image-side surface 642 of the fourth lens element 640 and the image plane 660; the IR-filter 650 is made of glass and has no influence on the focal length of the optical lens assembly.

The equation of the aspheric surface profiles of the sixth embodiment has the same form as that of the first embodiment.

In the sixth embodiment of the present optical lens assembly, the focal length of the optical lens assembly is f, and it satisfies the relation: f=6.06 (mm).

In the sixth embodiment of the present optical lens assembly, the f-number of the optical lens assembly is Fno, and it satisfies the relation: Fno=2.45.

In the sixth embodiment of the present optical lens assembly, half of the maximal field of view of the optical lens assembly is HFOV, and it satisfies the relation: HFOV=35.2 deg.

In the sixth embodiment of the present optical lens assembly, the thickness of the first lens element 610 on the optical axis is CT1, the thickness of the second lens element 620 on the optical axis is CT2, and they satisfy the relation: CT1/CT2=0.29.

In the sixth embodiment of the present optical lens assembly, the thickness of the fourth lens element 640 on the optical axis is CT4, the focal length of the optical lens assembly is f, and they satisfy the relation: CT4/f=0.50.

In the sixth embodiment of the present optical lens assembly, the radius of curvature of the image-side surface 622 of the second lens element 620 is R4, the radius of curvature of the object-side surface 621 of the second lens element 620 is R3, and they satisfy the relation: |R4/R3|=0.72.

In the sixth embodiment of the present optical lens assembly, the radius of curvature of the object-side surface 641 of the fourth lens element 640 is R7, the radius of curvature of the image-side surface 642 of the fourth lens element 640 is R8, and they satisfy the relation: |R7/R8|=0.03.

In the sixth embodiment of the present optical lens assembly, the radius of curvature of the object-side surface 631 of the third lens element 630 is R5, the radius of curvature of the image-side surface 632 of the third lens element 630 is R6, and they satisfy the relation: (R5+R6)/(R5−R6)=−3.41.

In the sixth embodiment of the present optical lens assembly, the focal length of the optical lens assembly is f, the focal length of the first lens element 610 is f1, and they satisfy the relation: f/f1=0.33.

In the sixth embodiment of the present optical lens assembly, the focal length of the second lens element 620 is f2, the focal length of the fourth lens element 640 is f4, and they satisfy the relation: f2/f4=1.56.

In the sixth embodiment of the present optical lens assembly, the vertical distance between the farthest point of the effective light entry area on the image-side surface 642 of the fourth lens element 640 and the optical axis is Y42, the distance on the optical axis between the image-side surface 642 of the fourth lens element 640 and the vertical projection from the farthest point on the image-side surface 642 of the fourth lens element 640 to the optical axis is SAG42, the thickness of the fourth lens element 640 on the optical axis is CT4, and they satisfy the relation: SAG42/CT4=−0.19.

In the sixth embodiment of the present optical lens assembly, the distance on the optical axis between the aperture stop 600 and the image-side surface 642 of the fourth lens element 640 is Sd, the distance on the optical axis between the object-side surface 611 of the first lens element 610 and the image-side surface 642 of the fourth lens element 640 is Td, and they satisfy the relation: Sd/Td=0.90.

In the sixth embodiment of the present optical lens assembly, the distance on the optical axis between the object-side surface 611 of the first lens element 610 and the image plane is TTL, half of the diagonal length of the effective pixel area of the image sensor is ImgH, and they satisfy the relation: TTL/ImgH=3.32.

The detailed optical data of the sixth embodiment is shown in FIG. 17 (TABLE 11), and the aspheric surface data is shown in FIG. 18 (TABLE 12), wherein the units of the radius of curvature, the thickness and the focal length are expressed in mm, and HFOV is half of the maximal field of view.

It is to be noted that TABLES 1-12 (illustrated in FIGS. 7-18 respectively) show different data of the different embodiments, however, the data of the different embodiments are obtained from experiments. Therefore, any optical lens assembly of the same structure is considered to be within the scope of the present invention even if it uses different data. The embodiments depicted above and the appended drawings are exemplary and are not intended to limit the scope of the present invention. TABLE 13 (illustrated in FIG. 19) shows the data of the respective embodiments resulting from the equations.

What is claimed is:

1. An optical lens assembly comprising, in order from an object side to an image side:
   a first lens element with positive refractive power;
   a second lens element with positive refractive power;
   a third lens element with negative refractive power having a concave object-side surface and a convex image-side surface, at least one of the object-side and image-side surfaces thereof being aspheric; and
   a fourth lens element with positive refractive power having an aspheric object-side surface and an aspheric image-side surface; wherein the number of lens elements with refractive power is four; and wherein a thickness of the first lens element on an optical axis is CT1, a thickness of the second lens element on the optical axis is CT2, a radius of curvature of the object-side surface of the fourth lens element is R7, a radius of curvature of the image-side surface of the fourth lens element is R8, a thickness of the fourth lens element on the optical axis is CT4, a focal length of the optical lens assembly is f, and they satisfy the relations: 0.0<CT1/CT2<0.6; |R7/R8|<1.0; and 0.25<CT4/f<0.85.

2. The optical lens assembly according to claim 1, wherein the second lens element has a convex image-side surface and the fourth lens element has a convex object-side surface, and wherein the third lens element and the fourth lens element are made of plastic material.

3. The optical lens assembly according to claim 2, wherein at least one of the object-side and image-side surfaces of the fourth lens element is provided with at least one inflection point.

4. The optical lens assembly according to claim 3 further comprising an aperture stop, wherein a distance on the optical axis between the aperture stop and the image-side surface of the fourth lens element is Sd, a distance on the optical axis between an object-side surface of the first lens element and the image-side surface of the fourth lens element is Td, and they satisfy the relation: 0.75<Sd/Td<0.94.

5. The optical lens assembly according to claim 4, wherein a radius of curvature of the object-side surface of the third lens element is R5, a radius of curvature of the image-side surface of the third lens element is R6, and they satisfy the relation: −7<(R5+R6)/(R5−R6)<−2.

6. The optical lens assembly according to claim 4, wherein a focal length of the second lens element is f2, a focal length of the fourth lens element is f4, and they satisfy the relation: 0.75<f2/f4<1.65.

7. The optical lens assembly according to claim 4, wherein the focal length of the optical lens assembly is f, a focal length of the first lens element is f1, and they satisfy the relation: 0.0<f/f1<0.5.

8. The optical lens assembly according to claim 3, wherein the radius of curvature of the object-side surface of the fourth lens element is R7, the radius of curvature of the image-side surface of the fourth lens element is R8, and they satisfy the relation: |R7/R8|<0.70.

9. The optical lens assembly according to claim 8, wherein the focal length of the optical lens assembly is f, the focal length of the first lens element is f1, and they satisfy the relation: 0.0<f/f1<0.5.

10. The optical lens assembly according to claim 8, wherein a radius of curvature of the image-side surface of the second lens element is R4, a radius of curvature of an object-side surface of the second lens element is R3 and they satisfy the relation: 0.1<|R4/R3|<0.7.

11. The optical lens assembly according to claim 8, wherein the radius of curvature of the object-side surface of the fourth lens element is R7, the radius of curvature of the image-side surface of the fourth lens element is R8, and they satisfy the relation: |R7/R8|<0.35.

12. The optical lens assembly according to claim 8, wherein the thickness of the first lens element on the optical axis is CT1, the thickness of the second lens element on the optical axis is CT2, and they satisfy the relation: 0.0<CT1/CT2<0.35.

13. The optical lens assembly according to claim 3, wherein at least one of the object-side and image-side surfaces of the third lens element is provided with at least one inflection point.

14. The optical lens assembly according to claim 3, wherein the first lens element has a convex object-side surface and a concave image-side surface, and wherein the thickness of the fourth lens element on the optical axis is CT4, the focal length of the optical lens assembly is f, and they satisfy the relation: 0.30<CT4/f<0.60.

15. The optical lens assembly according to claim 14, wherein the radius of curvature of the object-side surface of the third lens element is R5, the radius of curvature of the image-side surface of the third lens element is R6, and they satisfy the relation: −4.0<(R5+R6)/(R5−R6)<−2.0.

16. The optical lens assembly according to claim 14, wherein a vertical distance between a farthest point of an effective light entry area on the image-side surface of the fourth lens element and the optical axis is Y42, a distance on the optical axis between the image-side surface of the fourth lens element and a vertical projection from the farthest point on the image-side surface of the fourth lens element to the optical axis is SAG42, the thickness of the fourth lens element on the optical axis is CT4, and they satisfy the relation: −0.45<SAG42/CT4<0.3.

17. The optical lens assembly according to claim 1 further comprising an image sensor disposed on an image plane, wherein a distance on the optical axis between the object-side surface of the first lens element and the image plane is TTL, half of a diagonal length of an effective pixel area of the image sensor is ImgH, and they satisfy the relation: TTL/ImgH<3.5.

18. An optical lens assembly comprising, in order from an object side to an image side:
 a first lens element with positive refractive power;
 a second lens element with positive refractive power having a convex image-side surface;
 a third lens element with negative refractive power having a concave object-side surface and a convex image-side surface, at least one of the object-side and image-side surfaces thereof being aspheric; and
 a fourth lens element with positive refractive power having an aspheric convex object-side surface and an aspheric image-side surface; wherein the optical lens assembly further comprises an aperture stop; and wherein a thickness of the first lens element on an optical axis is CT1, a thickness of the second lens element on the optical axis is CT2, a thickness of the fourth lens element on the optical axis is CT4, a focal length of the optical lens assembly is f, a distance on the optical axis between the aperture stop and the image-side surface of the fourth lens element is Sd, a distance on the optical axis between an object-side surface of the first lens element and the image-side surface of the fourth lens element is Td, and they satisfy the relations: 0.0<CT1/CT2<0.6; 0.25<CT4/f<0.85; and 0.75<Sd/Td<0.94.

19. The optical lens assembly according to claim 18, wherein the first lens element has a convex object-side surface and a concave image-side surface, and wherein the focal length of the optical lens assembly is f, a focal length of the first lens element is f1, and they satisfy the relation: 0.0<f/f1<0.5.

20. The optical lens assembly according to claim 19, wherein the third lens element and the fourth lens element are made of plastic material, and wherein at least one of the object-side and image-side surfaces of the fourth lens element is provided with at least one inflection point.

21. The optical lens assembly according to claim 20, wherein a radius of curvature of the object-side surface of the fourth lens element is R7, a radius of curvature of the image-side surface of the fourth lens element is R8, and they satisfy the relation: |R7/R8|<0.70.

22. The optical lens assembly according to claim 20, wherein a vertical distance between a farthest point of an effective light entry area on the image-side surface of the fourth lens element and the optical axis is Y42, a distance on the optical axis between the image-side surface of the fourth lens element and a vertical projection from the farthest point on the image-side surface of the fourth lens element to the optical axis is SAG42, the thickness of the fourth lens element on the optical axis is CT4, and they satisfy the relation: −0.45<SAG42/CT4<0.3.

23. The optical lens assembly according to claim 20, wherein the thickness of the first lens element on the optical axis is CT1, the thickness of the second lens element on the optical axis is CT2, and they satisfy the relation: 0.0<CT1/CT2<0.35.

* * * * *